United States Patent [19]
Perlman

[11] Patent Number: 5,862,220
[45] Date of Patent: Jan. 19, 1999

[54] METHOD AND APPARATUS FOR USING NETWORK ADDRESS INFORMATION TO IMPROVE THE PERFORMANCE OF NETWORK TRANSACTIONS

[75] Inventor: Stephen G. Perlman, Mountain View, Calif.

[73] Assignee: WebTV Networks, Inc., Mountain View, Calif.

[21] Appl. No.: 656,923

[22] Filed: Jun. 3, 1996

[51] Int. Cl.[6] .............................. H04L 9/08; H04L 9/00
[52] U.S. Cl. .............................. 380/21; 380/9; 380/10; 380/49; 380/59
[58] Field of Search ...................... 380/4, 9, 21, 23, 380/25, 49, 50, 59, 10

[56] References Cited

U.S. PATENT DOCUMENTS

| | | | |
|---|---|---|---|
| 4,182,933 | 1/1980 | Roseblum | 380/21 |
| 4,852,151 | 7/1989 | Dittakavi et al. | 379/97 |
| 4,876,717 | 10/1989 | Barron et al. | 380/25 |
| 4,922,523 | 5/1990 | Hashimoto | 379/96 |
| 4,975,944 | 12/1990 | Cho | 379/209 |
| 4,995,074 | 2/1991 | Goldman et al. | 379/97 |
| 5,005,011 | 4/1991 | Perlman et al. | 340/728 |
| 5,056,140 | 10/1991 | Kimbell | 380/23 |
| 5,095,494 | 3/1992 | Takahashi et al. | 375/10 |
| 5,241,587 | 8/1993 | Horton et al. | 379/92 |
| 5,263,084 | 11/1993 | Chaput et al. | 379/215 |
| 5,287,401 | 2/1994 | Lin | 379/98 |
| 5,299,307 | 3/1994 | Young | 395/161 |
| 5,325,423 | 6/1994 | Lewis . | |
| 5,341,293 | 8/1994 | Vertelney et al. | 364/419.17 |
| 5,369,688 | 11/1994 | Tsukamoto et al. | 379/100 |
| 5,410,541 | 4/1995 | Hotto | 370/76 |
| 5,425,092 | 6/1995 | Quirk | 379/215 |
| 5,469,540 | 11/1995 | Powers, III et al. | 395/158 |
| 5,488,411 | 1/1996 | Lewis | 348/8 |
| 5,490,208 | 2/1996 | Remillard | 379/96 |
| 5,538,255 | 7/1996 | Barker . | |
| 5,561,709 | 10/1996 | Remillard | 379/96 |
| 5,564,001 | 10/1996 | Lewis . | |
| 5,612,730 | 3/1997 | Lewis | 348/8 |

OTHER PUBLICATIONS

Matt Rosoff, Review: "Gateway Destination PC," c/net inc., 2 pages, Feb. 19, 1996.
Robert Seidman, Article: What Larry and Lou Know (That You Don't), c/net inc., 2 pages, Jan. 29, 1996.
Susan Stellin, Article: "The $500 Web Box: Less is More?" c/net inc., 2 pages, 1996.

*Primary Examiner*—Bermarr E. Gregory
*Attorney, Agent, or Firm*—Workman, Nydegger & Seeley

[57] ABSTRACT

An apparatus and method for using network address information to improve the performance and increase the functionality of network transactions. is disclosed. In a client network interface device having a processor and a memory coupled to the processor, the memory having stored therein sequences of instructions which when executed by the processor cause the processor to perform the steps of: 1) accessing a first server over a secure data communication line to obtain a client encryption key, 2) accessing a second server over an unsecure data communication line to establish a connection with the second server, 3) encrypting information sent to the second server over the connection using the client encryption key obtained from the first server, and 4) decrypting information received from the second server over the connection using the client encryption key obtained from the first server. The present invention further includes sequences of instructions which when executed by the processor cause the processor to perform the steps of, 1) connecting to an unsecure server over an unsecure data communication line to perform unsecure portions of a data transaction, 2) disconnecting from the unsecure server; and 3) connecting to a secure server over a secure data communication line to perform secure portions of the data transaction.

52 Claims, 16 Drawing Sheets

METHOD AND APPARATUS FOR USING NETWORK ADDRESS INFORMATION TO IMPROVE THE PERFORMANCE OF NETWORK TRANSACTIONS

BACKGROUND OF THE INVENTION

1. Field of the Invention

This invention is in the field of telecommunications, as it relates to the use of network address information for network transactions.

2. Cross-References to Related Applications

The present application is related to the following co-pending U.S. patent applications:

U.S. patent application entitled, "Web Browser Allowing Navigation Between Hypertext Objects Using Remote Control," having application Ser. No. 08/660,088, and filed on Jun. 3, 1996, now pending; and U.S. patent application entitled, "Method and Apparatus for Providing Proxying and Transcoding of Documents in a Network," having application Ser. No. 08/656,924, and filed on Jun. 3, 1996, now pending;

U.S. patent application entitled, "Method and Apparatus For Managing Communications Between a Client and a Server in a Network," having application Ser. No. 08/660,087, and filed on Jun. 3, 1996, now pending; which are assigned to the assignee of the present invention.

3. Description of Related Art

Conventional computer network protocols are designed to operate within a given network topology. These protocols are flexible enough to handle many different arrangements of nodes and robust enough to handle changes in the topology as computers are added or removed from the network. Because of the need to maintain flexibility and mobility, conventional networks do not rely on information that is specific to a particular geographic location. These network protocols usually consider geographic independence to be an advantage.

In many areas of the United States, it is possible to determine a calling telephone number from the telephone network. Telephone network services such as Caller ID and Automatic Number Identification (ANI) can provide a caller's telephone number to a suitably equipped telephone answering device, and then the telephone number can be transferred to a server coupled to the answering device.

In many calling areas, however, Caller ID and Automatic Number Identification are not available either for technical or legislative reasons. In such areas it may be possible to verify a user's area code, and possibly the calling area (e.g. city), but in some cases no identification at all is possible. Without a direct method to identify or verify a user's telephone number, indirect methods can be used.

In various ways, therefore, conventional means are available for obtaining information pertaining to a particular network node or network user. Although this information is available, conventional network protocols do not provide the functionality to obtain this information or to use the information to optimize the operation of the network.

Thus, a better means and method is needed for optimizing network transactions.

SUMMARY OF THE INVENTION

The present invention is an apparatus and method for using network address information to improve the performance and increase the functionality of network transactions. A client network interface device is disclosed as having a processor and a memory coupled to the processor, the memory having stored therein sequences of instructions which when executed by the processor cause the processor to perform the steps of: 1) accessing a first server over a secure data communication line to obtain a client encryption key, 2) accessing a second server over an unsecure data communication line to establish a connection with the second server, 3) encrypting information sent to the second server over the connection using the client encryption key obtained from the first server, and 4) decrypting information received from the second server over the connection using the client encryption key obtained from the first server. The present invention further includes a client network interface device having a processor and a memory coupled to the processor, the memory having stored therein sequences of instructions which when executed by the processor cause the processor to perform the steps of, 1) connecting to an unsecure server over an unsecure data communication line to perform unsecure portions of a data transaction, 2) disconnecting from the unsecure server; and 3) connecting to a secure server over a secure data communication line to perform secure portions of the data transaction.

It is an advantage of the present invention that information external to a network can be obtained and used to optimize network transactions. It is a further advantage of the present invention that automatic number identification provided in a conventional telephone network can be used to improve the performance and increase the functionality of network transactions.

These and other advantages of the present invention are fully described in the following detailed description of the preferred embodiment.

BRIEF DESCRIPTION OF THE DRAWINGS

The features and advantages of the present invention will be apparent from the accompanying drawings and from the detailed description of the preferred embodiment of the present invention as set forth below.

DETAILED DESCRIPTION OF THE PREFERRED EMBODIMENT

The present invention is an apparatus and method for using network address information to improve the performance of network transactions. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

WebTV™

Figure 1:
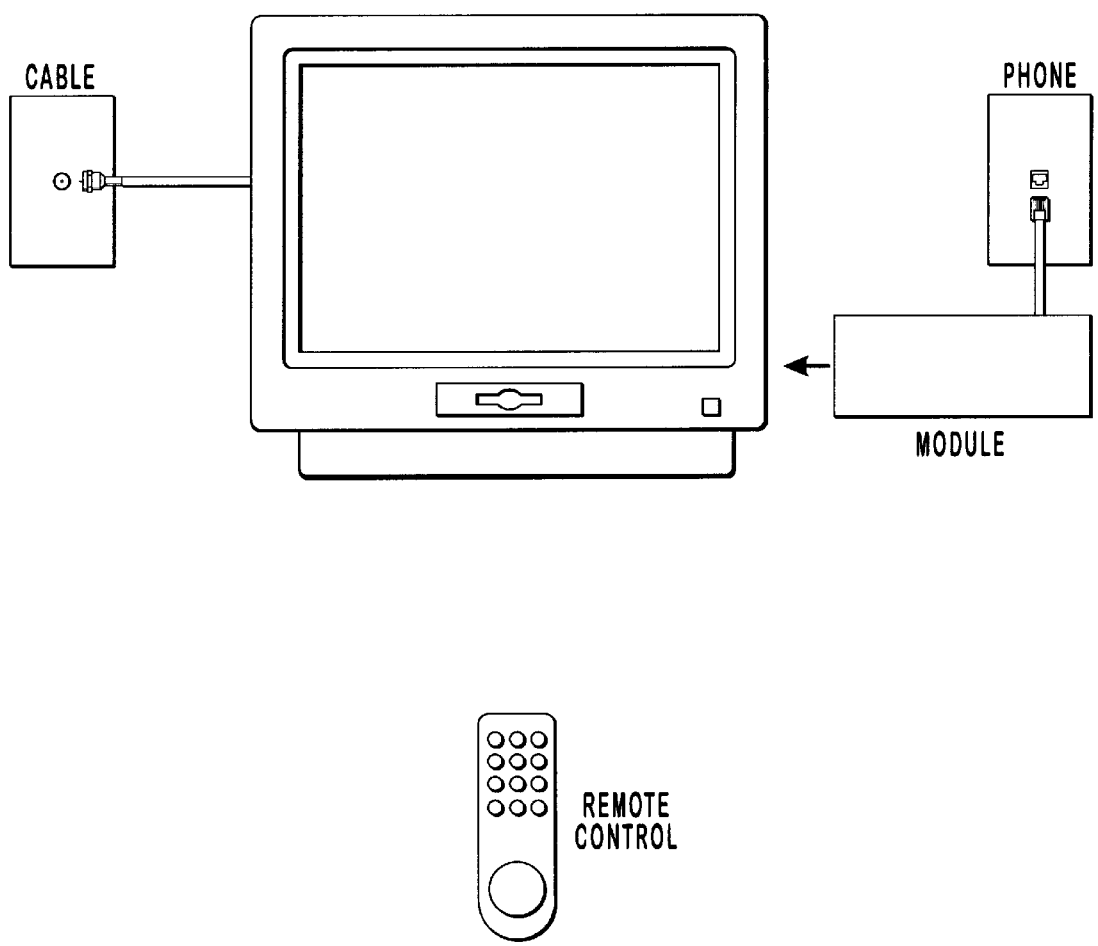
FIG. 1 illustrates the present invention as implemented on a module for use in a television set.
Figure 2:
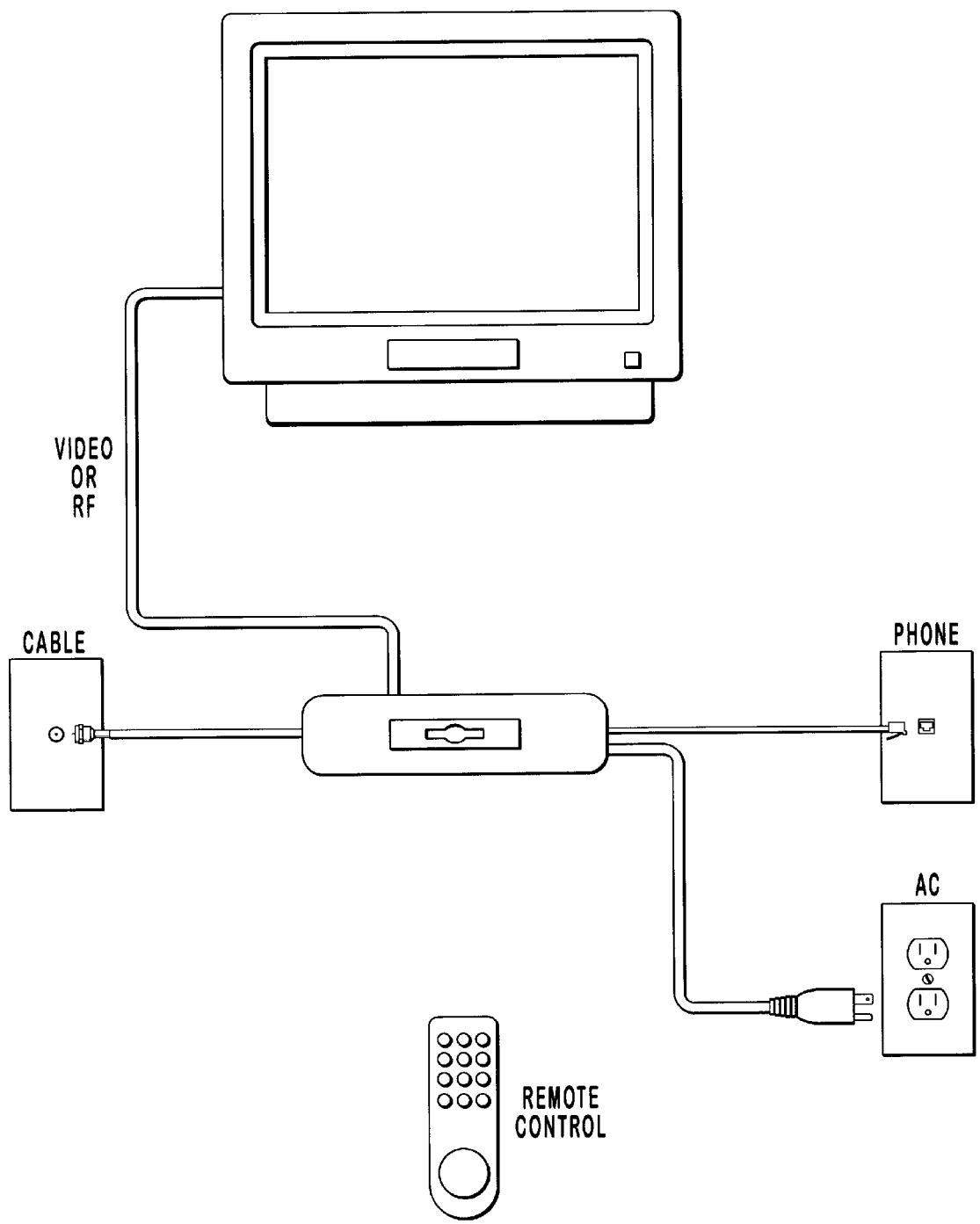
FIG. 2 illustrates the present invention as implemented with an integrated cable modem and decoder.
Figure 3:
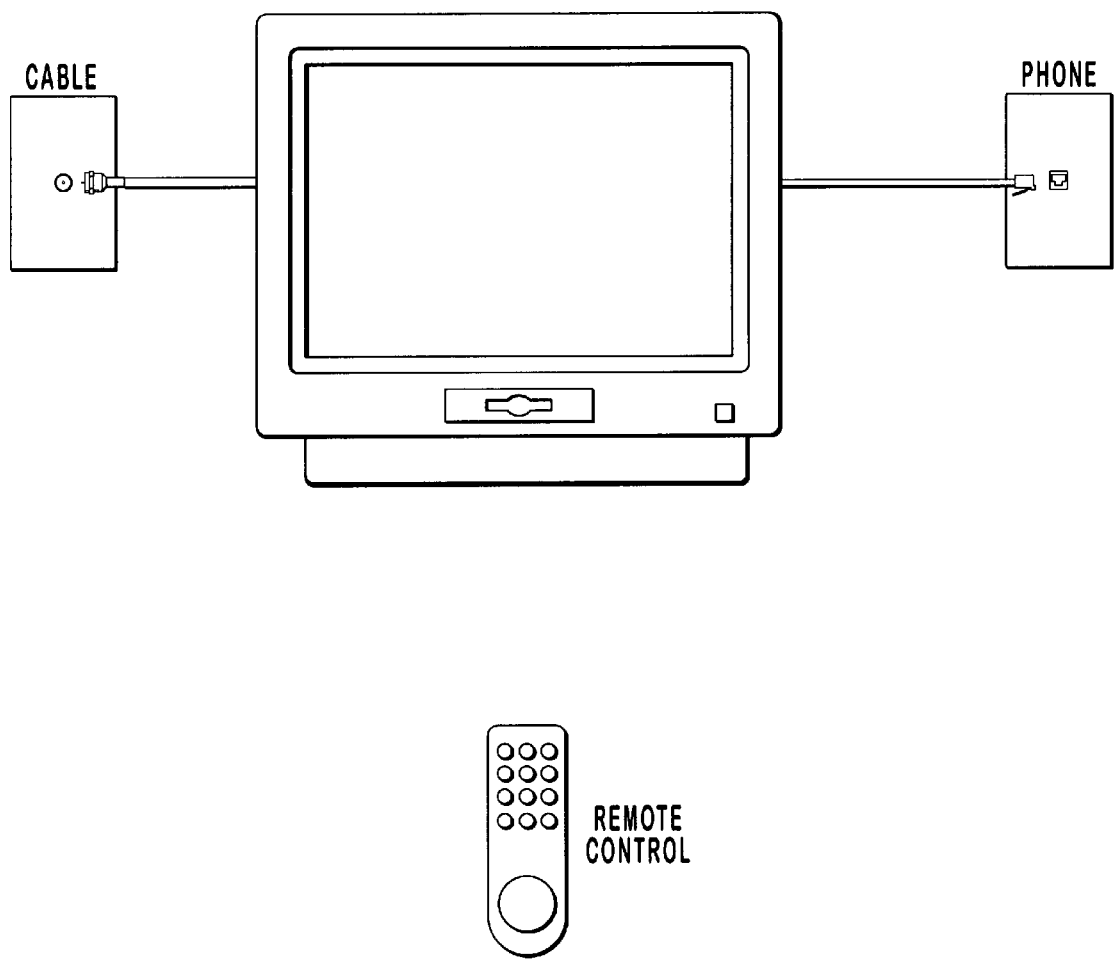
FIG. 3 illustrates the present invention as integrated in a television set.
Figure 4:
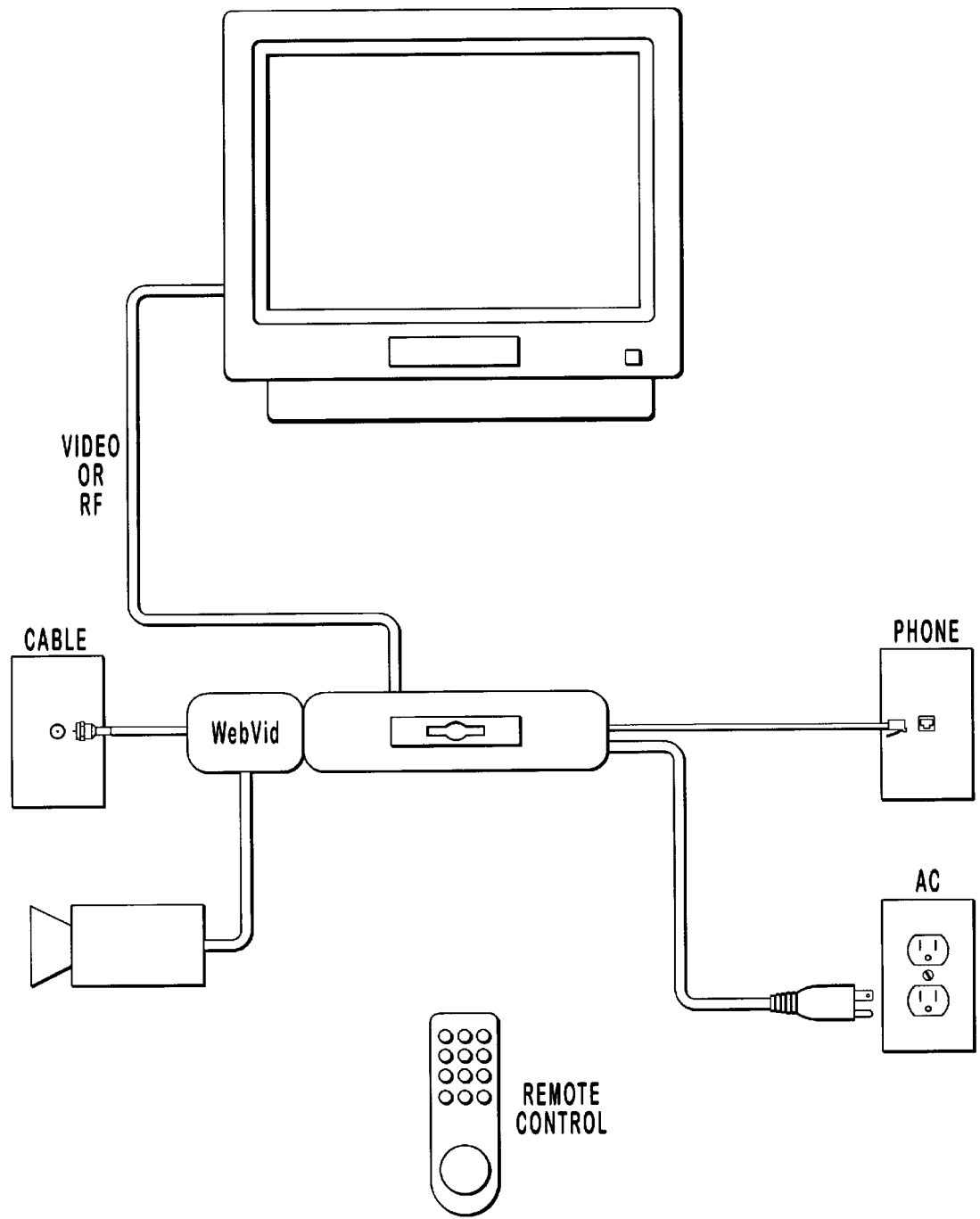
FIG. 4 illustrates the present invention as implemented with a cable modem and video input.
Figure 5:
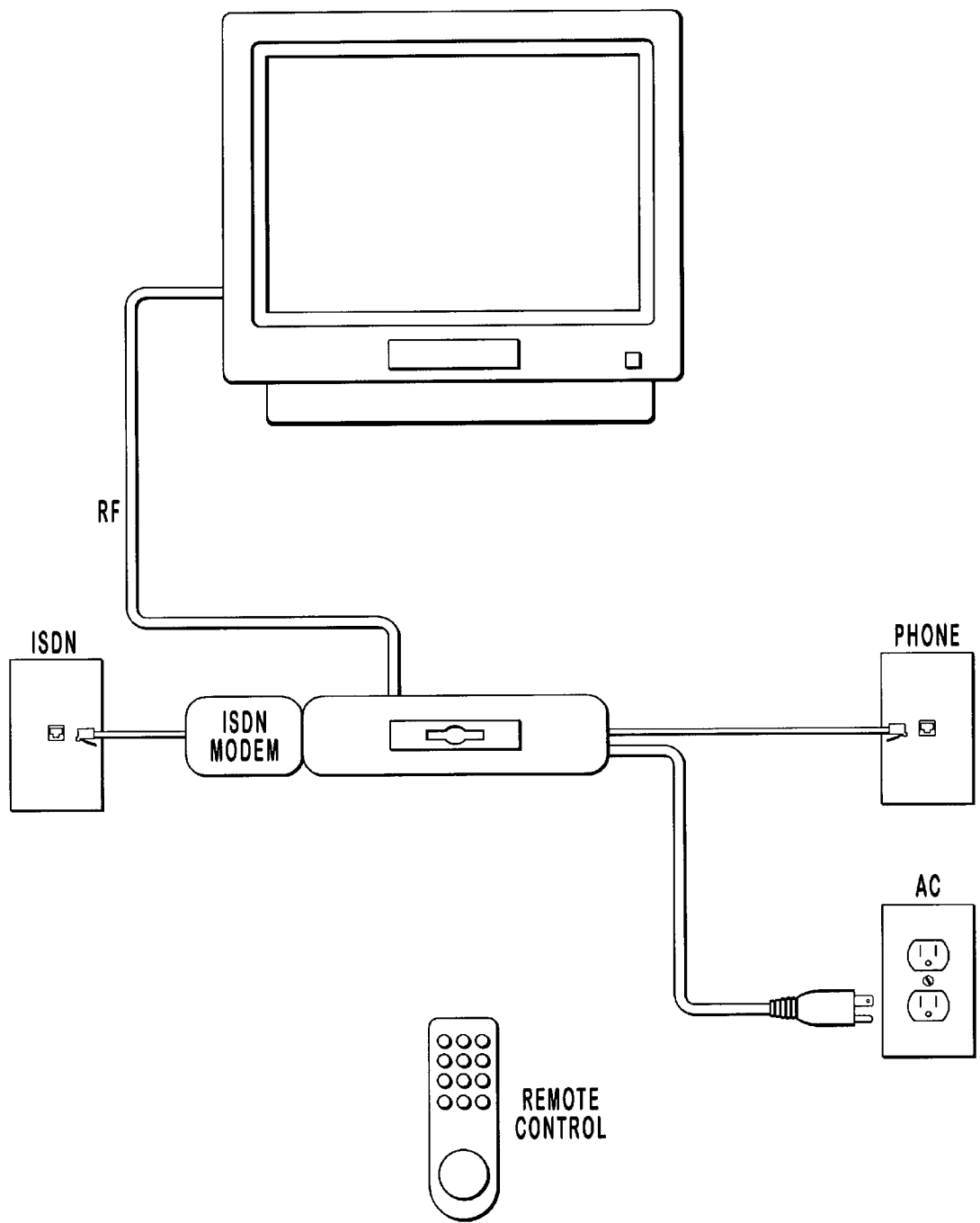
FIG. 5 illustrates the present invention as implemented with an ISDN modem.

The preferred embodiment of the present invention is a low-cost network interface device (WebTV™) that uses a standard television set as a display device and standard telephone lines and/or other residential communication networks as a network transport medium. The network interface device can be implemented as a system in various forms. FIG. 1 illustrates the network device as a module inserted into a jack provided on a standard television. FIG. 2 illustrates the network interface device as a device with an integrated cable modem and decoder built in. FIG. 3 illustrates the network interface device as an integrated unit built into a television set. FIG. 4 illustrates the network interface device as a device with a built in video interface and cable modem. FIG. 5 illustrates the network interface device with a built in ISDN (Integrated Services Digital Network) modem. In each case, a standard telephone connection is provided for the network interface device of the present invention to enable communication over the conventional telephone network. In configurations with cable modem capability, communication over a cable network is possible in addition to communication over the telephone network. The cable network is typically much faster (i.e. provides a much greater bandwidth) than the standard telephone network; however, cable modems are typically more expensive than standard POTS (as it is known in the art, "Plain Old Telephone Service") telephone modems. In an ISDN configuration, the network interface device has both an ISDN modem and a standard POTS modem. Again, the ISDN network is typically faster than the POTS telephone network; however, ISDN is currently more expensive.

In the preferred embodiment and in the description that follows, the present invention is described in the context of several different types of networks or portions of a network. Specifically, the following definitions clarify the different network types in which the preferred embodiment operates. These different network types include: the conventional POTS telephone network, the Internet network, World Wide Web (WWW) network, and the WebTV network. The POTS telephone network is a switched-circuit network that connects a client to a point of presence (POP) node or directly to a private server. The POP node and the private server connect the client to the Internet network, which is a packet-switched network using a transmission control protocol/Internet protocol (TCP/IP). The World Wide Web (WWW) network uses a hypertext transfer protocol (HTTP) and is implemented within the Internet network and supported by hypertext mark-up language (HTML) servers. The WebTV network uses an HTTP-based set of protocols implemented within the WWW network and supported by one or more HTML servers.

The WebTV network connects each client having a WebTV network interface device to other WebTV clients and to WebTV services. WebTV clients can also browse information on a wide-area network reached through one of the network connections, such as the Internet or World Wide Web (WWW), using the network interface device and the browser software provided therein. Although the WebTV browser is capable of browsing the World Wide Web directly, the WebTV network improves services beyond basic Internet access in several ways. WebTV network services, including user registration and electronic mail (email) are provided on the WebTV network. The WebTV network also improves user services by accelerating browsing to far away WWW sites and by eliminating delays. In addition, the WebTV network provides content tailored to the WebTV client's geographic area (geographic tailoring). In this manner, client access to localized services is improved. The WebTV network interface device can also efficiently tailor a response to a client or use an appropriate network medium that relates to a particular client request. For example, the higher cost ISDN or cable network media can be used when high data rates are required, while the less expensive POTS telephone network can be used for less critical or lower data rate transactions. The WebTV network can also offload storage from the WebTV network interface device, thereby reducing its cost.

Figure 6:
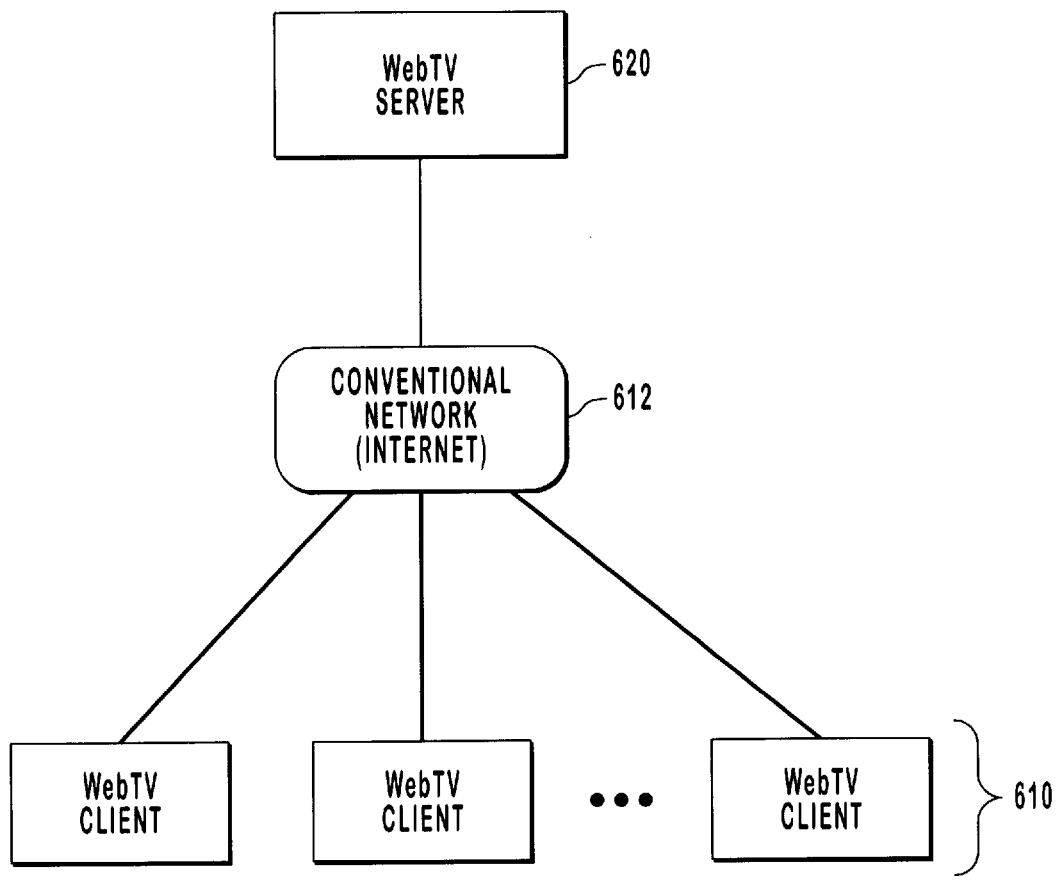
FIG. 6 illustrates the network configuration of the present invention.

Referring to FIG. 6, the basic construct of the WebTV network of the present invention is illustrated. A plurality of WebTV clients 610, each being a network interface device such as the WebTV network interface device described above, are coupled to a WebTV server 620 via a conventional network infrastructure 612, such as the Internet and WWW. The WebTV server 620 is a standard networked computer system (e.g. a Sun Microsystems SparcStation) upon which software implementing the network functionality of the present invention is executed. This functionality is described below.

Figure 7:
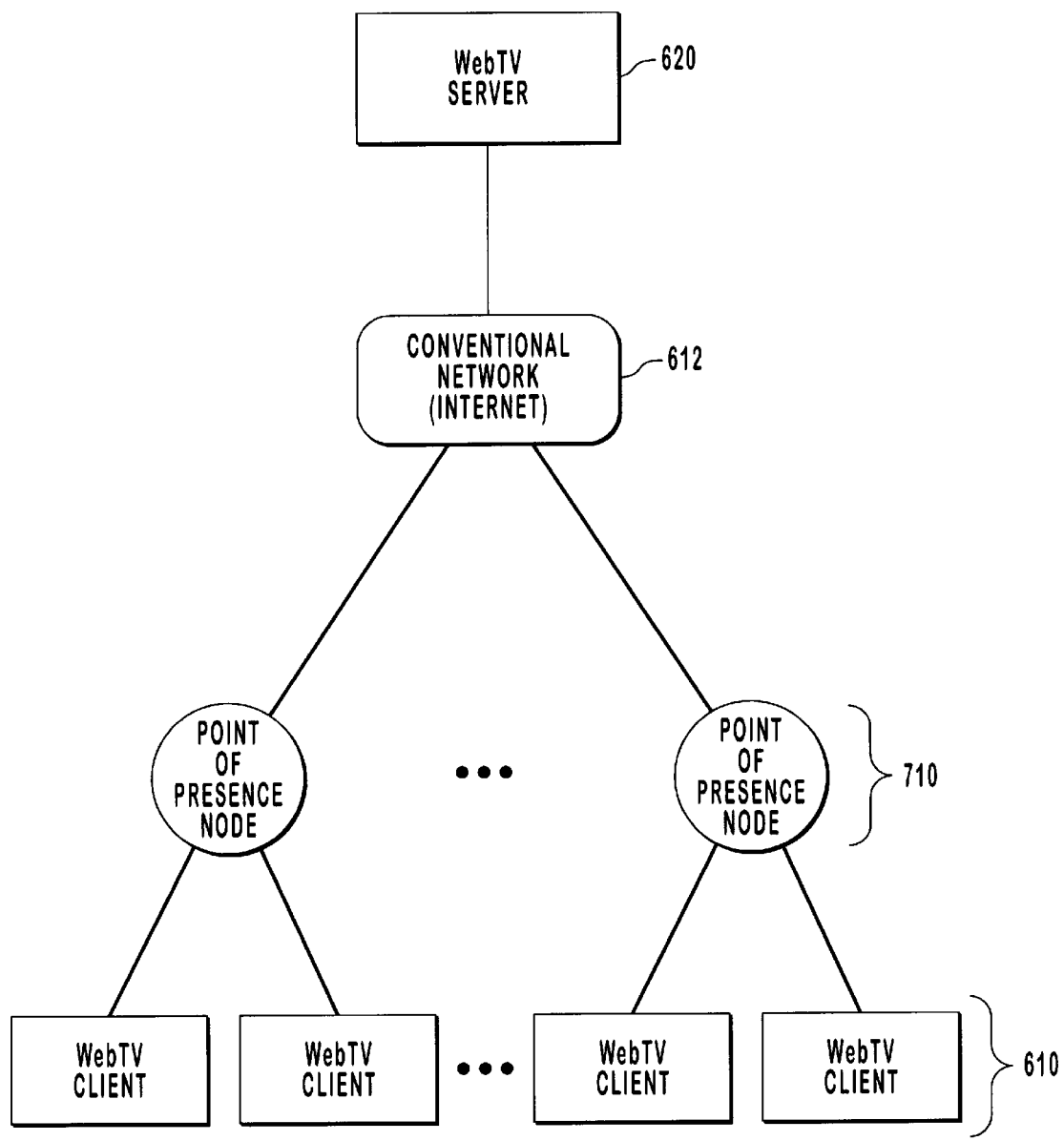
FIG. 7 illustrates the network configuration of the present invention with point of presence (POP) nodes.

Referring to FIG. 7, an alternative embodiment of the basic construct of the WebTV network of the present invention is illustrated. A plurality of WebTV clients 610, each being a network interface device such as the WebTV network interface device described above, are alternatively coupled to a plurality of point of presence (POP) nodes 710. The point of presence nodes 710 provide a means by which clients 610 can access the network 612 through a local node rather than incurring higher cost direct connections to network 612. In a telephone network, for example, it is less expensive for a client 610 to establish a telephone connection with a local point of presence node 710 (i.e. modem in the case of a telephone network) in the local calling area of the client 610 rather than make a long distance call to a node of network 612. In the configuration shown in FIG. 7, cost benefits for the client can be realized. The present invention, however, is not constrained to this configuration. Rather, the present invention can be implemented in either of the network configurations illustrated in FIG. 6, FIG. 7, or other equivalent network configurations.

Use of Automatic Number Identification (ANI) for security verification and authentication purposes.

ANI can be a effective tool for verifying the location from which a network access is being made. For example, a WebTV client network interface device 610 may access the WebTV network server 620 to request a particular type of service. In some circumstances, it is necessary or desirable to verify a client's identity before performing the requested service. Telephone network services such as Caller ID and Automatic Number Identification (ANI) can be used to provide a requesting client's telephone number to the WebTV server 620. This can be performed transparently to the client user. The WebTV server 620 may use the requesting client's telephone number to authorize the completion of a requested service by comparing the requesting client's telephone number to a list of authorized telephone numbers maintained in the server 620. If the requesting client's telephone number is on the server list, the requested service is completed for the client. If the requesting client's telephone number is not on the server list for the requested service, the client is notified that the requested service cannot be performed. Since ANI and Caller ID cannot be faked by a surreptitious user, this feature of the present invention allows the WebTV network to provide a significant level of security for network transactions. This authentication feature is described in more detail in the following sections.

There are a very few areas of the U.S. where ANI is not available. In such areas, the private server of the present invention will detect the lack of ANI and direct the client software to prompt the user for entry of a telephone number. Although the present invention cannot verify the accuracy of the user-entered telephone number, the present invention can nevertheless verify that the user-entered telephone number is not a telephone number from an area with ANI coverage.

Another test can be performed to verify that the assumed telephone number (whether obtained from ANI or user entry) of a client network interface device 610 is probably correct. That is, the client software in the client network interface device 610 can direct the client to dial its own assumed telephone number. If the dialed telephone number is not busy (i.e. a ring signal or disconnect signal is detected), the assumed client telephone number cannot be correct. If the dialed telephone number is busy, the assumed client telephone number probably is correct; because, most telephone numbers are not busy the vast majority of the time. These tests provide a nominal level of client telephone number validation in areas with or without ANI service.

Even in the very few areas of the U.S. and most of the world where ANI service is not available, the process of the present invention for obtaining a secure encryption key and for performing secure transactions via a secure network to a private server still operates. The only capability lost in these areas is the automatic verification of geographic locality provided by the present invention and described in more detail below.

Figure 8:
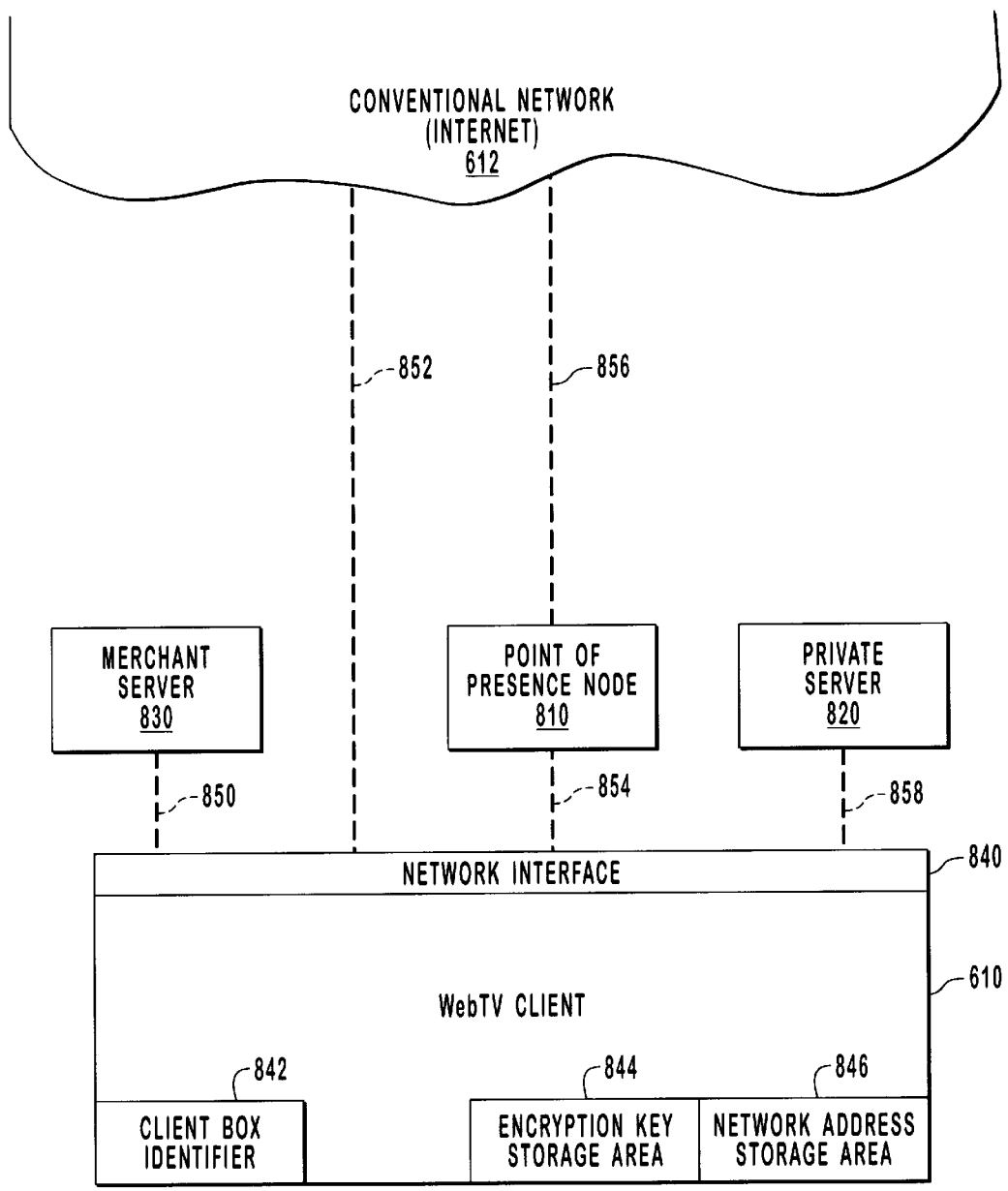
FIG. 8 illustrates the internal structure of the WebTV client of the present invention.

Referring now to FIGS. 8 through 15, block diagrams and flow charts illustrate the authentication feature of the preferred embodiment of the present invention. Referring now to FIG. 8, the interface between the WebTV client 610 and the conventional network 612 is illustrated. In the preferred embodiment, WebTV client 610 transmits and receives information over a direct communication channel 852 through network interface 840. Many conventional communication channels such as channel 852 exists in the prior art. These communication channels include conventional POTS telephone lines through modems, integrated services digital network (ISDN) lines, dedicated wire or fiber optic lines.

Alternatively, WebTV client 610 may be coupled to conventional network 612 through a point of presence node 810. As described earlier, point of presence node 810 provides a means for WebTV client 610 to interface with conventional network 612 through a local point of presence node 810. In this manner, the communication channel 854 between client 610 and point of presence node 810 can be a less expensive channel than the direct connect channel 852. In either configuration, WebTV client 610 is enabled to transmit and receive information via conventional network 612.

One characteristic of the conventional network 612 such as the Internet is the relatively unsecure transmission environment over the conventional network. Because of this unsecure characteristic of conventional network 612, confidential communications, commercial transactions, or other transfers of information or transactions requiring a secure environment cannot take place. For this reason, the present invention adds additional functionality to authenticate a particular WebTV client and establish a secure and confidential communication between WebTV client 610 and WebTV server 620. A private server 820 is used in the preferred embodiment of the present invention to create a secure network environment in a manner to be described in more detail below.

Referring again to FIG. 8, private server 820 is shown coupled to client 610 via a secure communication line 858. Secure communication line 858 can be any of a number of conventional secure communication techniques employed in the prior art including direct POTS telephone line connections, dedicated transmission lines, or point-to-point data communications media. In the preferred embodiment, a secure communication between WebTV client 610 and private server 820 is established by use of a pre-assigned (800) telephone number that establishes a direct point-to-point communication link between private server 820 and client 610. In this manner, a secure communication environment between client 610 and private server 820 can be guaranteed. Using the techniques of the present invention as described below, WebTV client 610 initially establishes a secure communication with private server 820 in order to subsequently establish a secure communication environment through conventional network 612.

In order to establish a secure communication environment with conventional network 612, WebTV client 610 includes a client box identifier 842. Client box identifier 842 is an electronically readable unique number or alphanumeric string which differentiates a particular WebTV client unit 610 from all others. Conventional techniques are well known for installing a unique identification code in an electronic device.

WebTV client 610 also includes an encryption key storage area 844 and a network address storage area 846. Storage areas 844 and 846 are electronically readable and modifiable memory locations used for the storage of particular items of information used during the authentication process of the present invention. Encryption key storage area 844 is used for the storage of an encryption key provided by the private server 820 and used by client 610 in its communications through conventional network 612. Network address storage area 846 is used for the storage of a network address at which WebTV client 610 is currently located. In the case of a telephone link between client 610 and network 612, the client network address represents the telephone number from which client 610 is calling. Both encryption key 844 and network address 846 may be stored in a variety of conventional memory means including battery-backed CMOS memory, flash memory, dynamic random access memory (DRAM), or static random access memory (SRAM).

The WebTV client 610, WebTV server 620, and private server 820 may include computer-readable media having stored thereon computer-executable instructions for executing selected steps of the methods disclosed herein. By way of example, and not limitation, such computer readable media comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combination of the above are also included within the scope of computer readable media.

Figure 9:
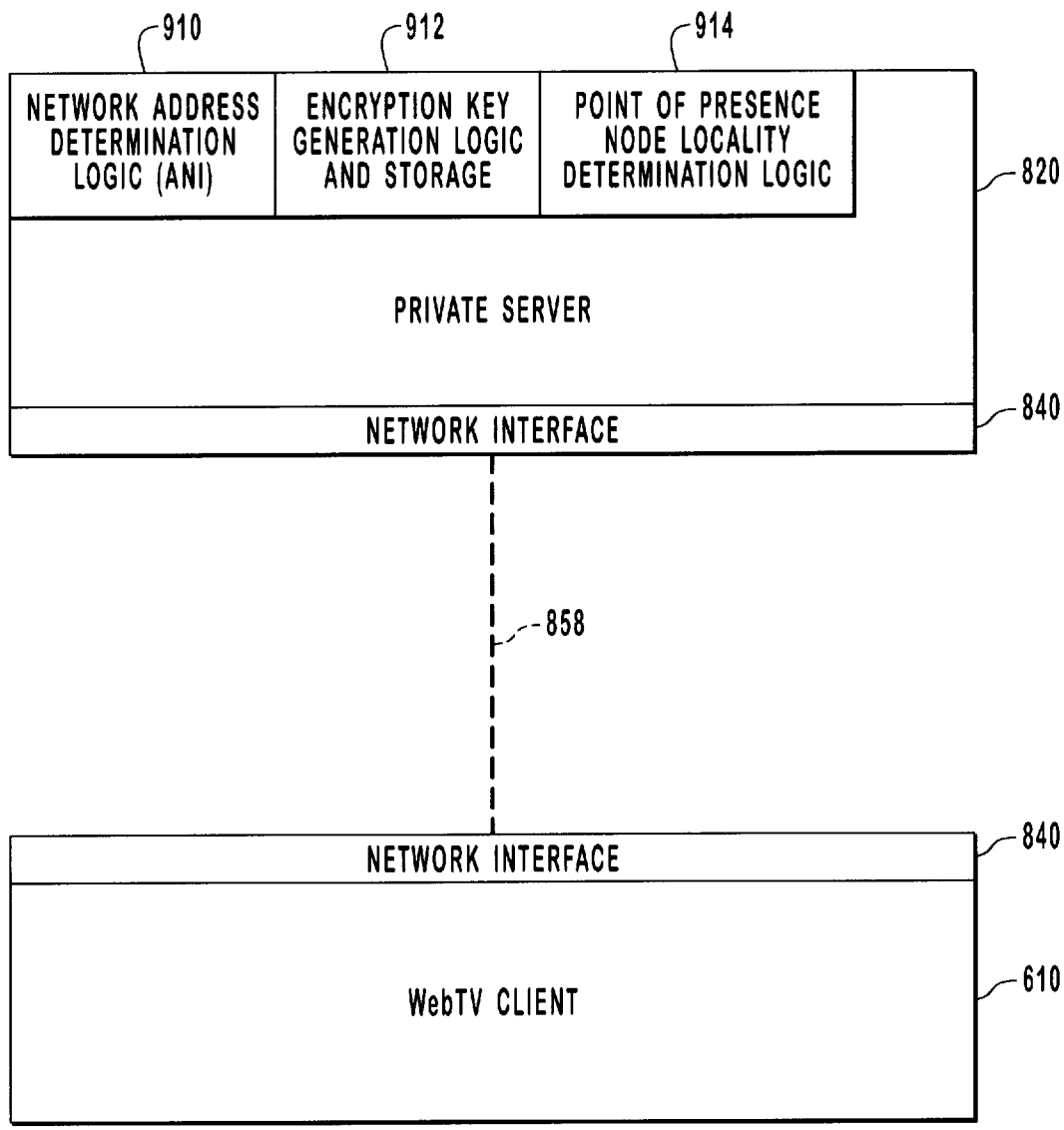
FIG. 9 illustrates the internal structure of the private server of the present invention.

Referring now to FIG. 9, the internal components of private server 820 (first server) used for authentication are illustrated. Private server 820 includes network address determination logic 910. Network address determination logic 910 is used by private server 820 to determine a network address from which a client 610 is communicating. In the case of a telephone network, network address determination logic 910 comprises automatic number identification (ANI) logic for determining the telephone number from which client 610 is calling. The use of ANI is well known to those of ordinary skill in the art. Private server 820 employs this conventional technique in a novel and useful way for authenticating a client 610 in a networked computer environment.

Conventional computer systems and networks provide secure transactions, typically by use of an encryption key. The need for an encryption key is assumed for conventional secure transactions. There are many techniques known in the art for utilizing an encryption key to effect secure transactions on an open channel (e.g. Rivest, Shamir, Adleman (RSA) protocol, Secure Socket Layer (SSL) protocol, etc.); however, all of these conventional techniques are compromised when there is not a secure channel for transferring the encryption key between the client and the server. In the present invention, a secure POTS or ISDN network provides the secure channel over which the encryption key can be safely and securely transferred between the client and the private POTS or ISDN server. Thereafter, an unsecure network (i.e. the Internet, WWW, or other public unsecure network) can be used for normal secure data transactions between the client and the server using the encryption key previously obtained over the secure network. This process of using a secure network to obtain an encryption key which is later used on an unsecure network is not part of the prior art and an important part of the authentication process of the present invention.

Referring again to FIG. 9, private server 820 includes encryption key generation logic and storage 912. Because the data communication line 858 between client 610 and private server 820 is a private and secure communication line, private server 820 can be used by client 610 to generate and provide a unique encryption key for client 610. The encryption key for a particular WebTV client 610 is generated by logic 912 and stored in association with the network address of the client 610 for which the encryption key was generated. Point of presence node locality determination logic 914 in private server 820 is used to determine the closest point of presence node to the client 610 requesting such information from private server 820. Using client network address information determined by logic 910, point of presence node locality determination logic 914 can access an internal list of point of presence nodes to determine which node on the list is closest to the corresponding client network address. A typical transaction between client 610 and private server 820 is described below in more detail in connection with the flow charts of FIGS. 11 through 15.

Figure 10:
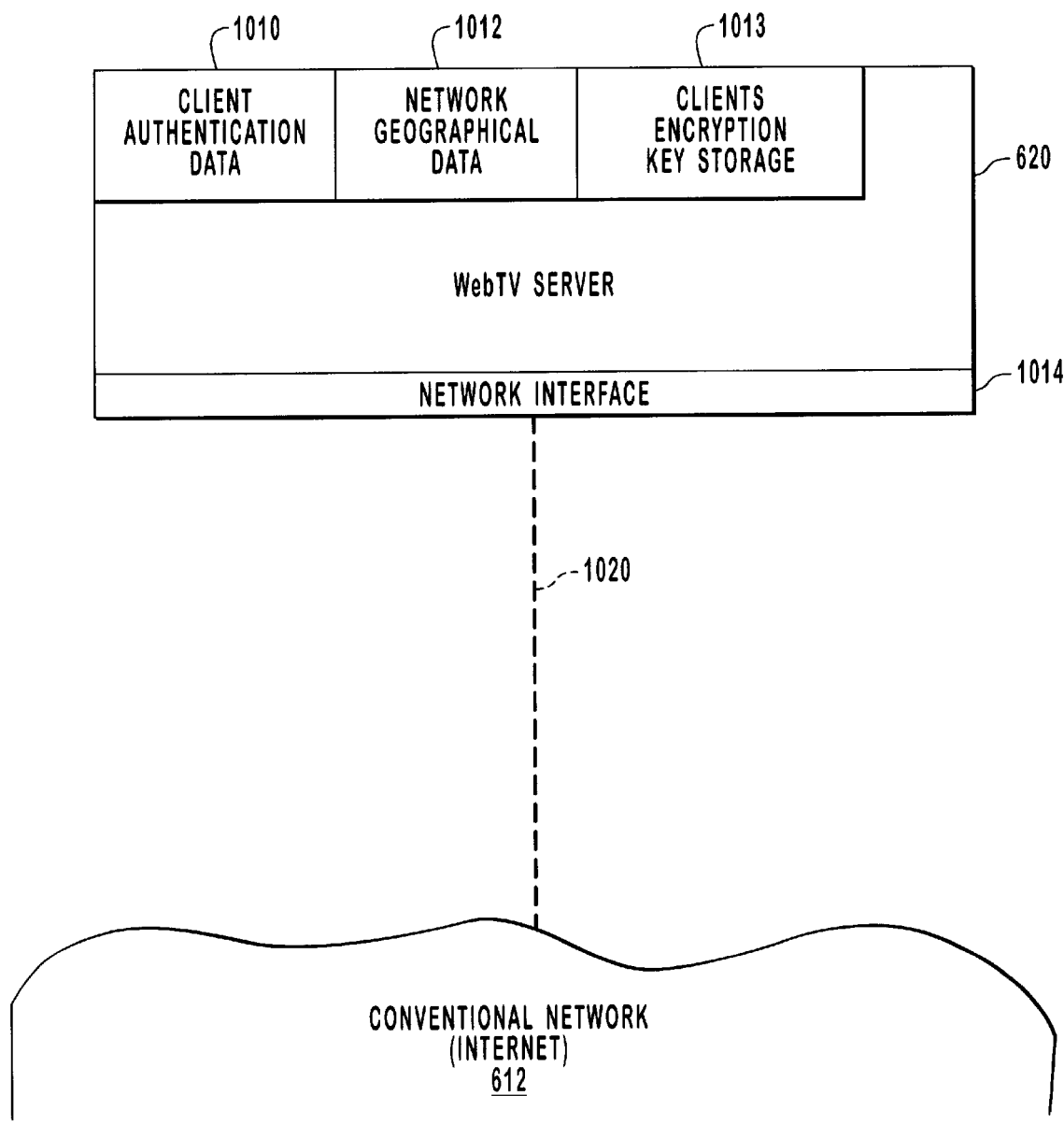
FIG. 10 illustrates the internal structure of the WebTV server of the present invention.

Referring now to FIG. 10, internal components of WebTV server 620 (second server) are shown. WebTV server 620 is coupled to conventional network 612 via data communication line 1020. Data communication line 1020 comprises any of a variety of conventional network access means including digital telephone links, ISDN lines, cable links, wireless transmission, or any of a variety of other conventional means. WebTV server 620 provides a variety of services customized for a WebTV client 610. It is critical, however that the transaction between client 610 and WebTV server 620 be a secure data communication link. This is not always possible on an unsecure network like network 612. For this reason, WebTV server 620 provides client authentication data 1010. Client authentication data 1010 represents information indicating a client network address and a client box identifier associated with each particular client. In addition, WebTV server 620 retains an encryption key associated with each particular client in client encryption key storage area 1013. These items of information are maintained for each client accessing WebTV server 620. The manner in which this information is used to authenticate a client is described in more detail in connection with the flow charts of FIGS. 11 through 15.

WebTV server 620 also maintains network geographical data 1012. It is convenient in many circumstances to determine the geographical locality of a particular WebTV client 610. Using client geographical locality information, services requested by a particular client can be better configured and optimized based on the client locality information. Network geographical data 1012 represents information associating particular client network addresses with a corresponding geographical locality. The use of this information by WebTV server 620 is described in more detail in connection with the flow charts of FIGS. 11 through 15.

Figure 11:
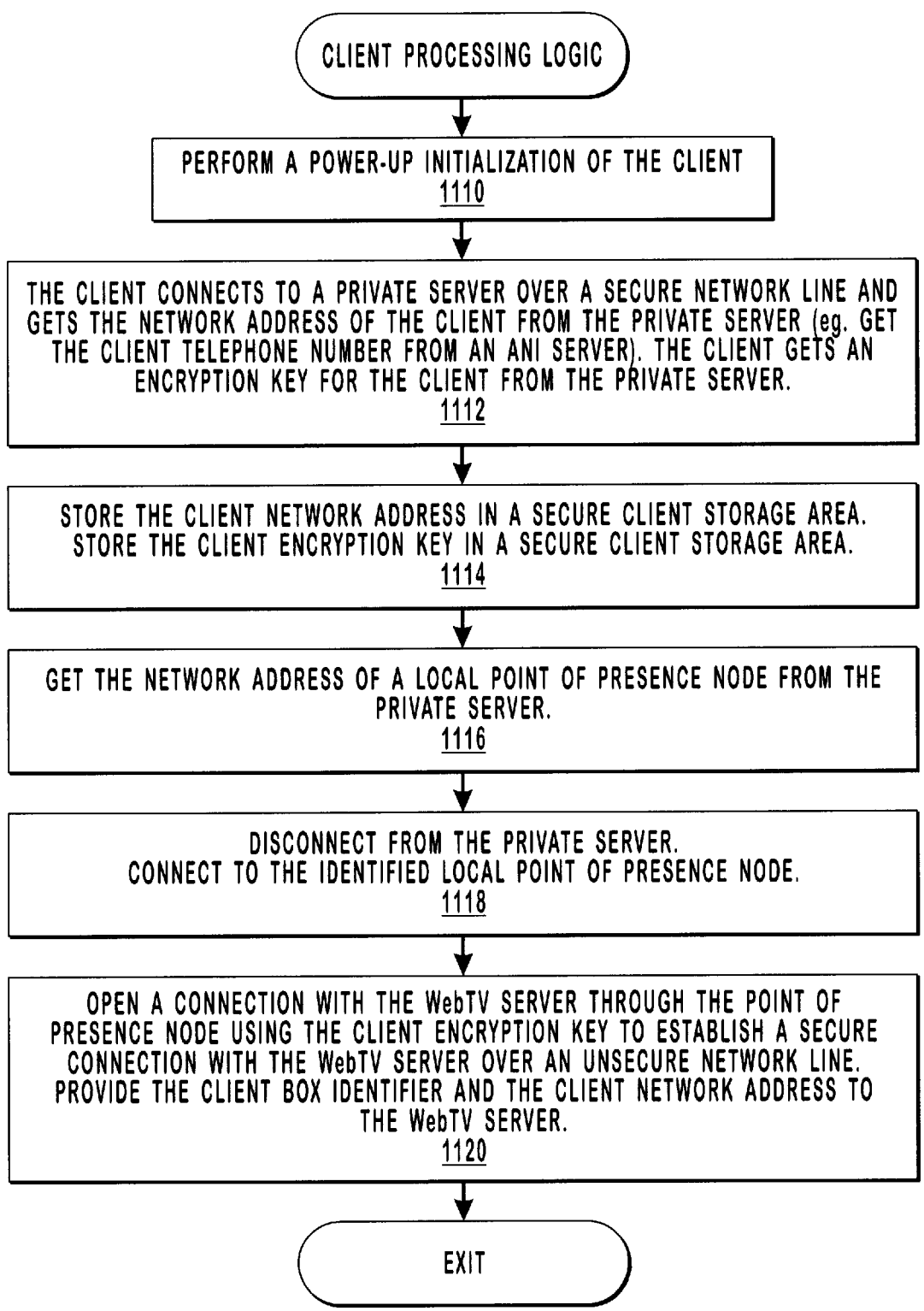
FIGS. 11–16 are flowcharts illustrating the processing logic flow of the present invention.

Referring now to FIG. 11, a flow chart illustrates the processing performed by a WebTV client 610. The logic illustrated in FIG. 11 is used by a client 610 to establish a secure data communication link with a WebTV server 620 over a conventional unsecure data network. In a first processing step 1110, client 610 performs a power-up initialization. Next, client 610 connects to private server 820 over a secure network line 858. Once client 610 is connected with private server 820, client 610 requests the private server 820 to determine the client network address of client 610. Because it is not always possible for client 610 to determine its own network address, this information must be requested from private server 820. If access by client 610 to conventional network 612 is performed using a standard POTS telephone network, private server 820 can use conventional automatic number identification (ANI) functionality to obtain the telephone number from which client 610 is calling. In the POTS telephone network situation, this client telephone number represents the client network address from which the client 610 is accessing the network. Once the private server 820 obtains the client network address, this client network address is stored on private server 820 and/or provided back to the requesting client 610. In addition, the private server 820 generates an encryption key for the client 610. This encryption key is specific to that particular client and is used for encrypting subsequent data communications between client 610 and WebTV server 620 (processing block 1112).

Figure 12:
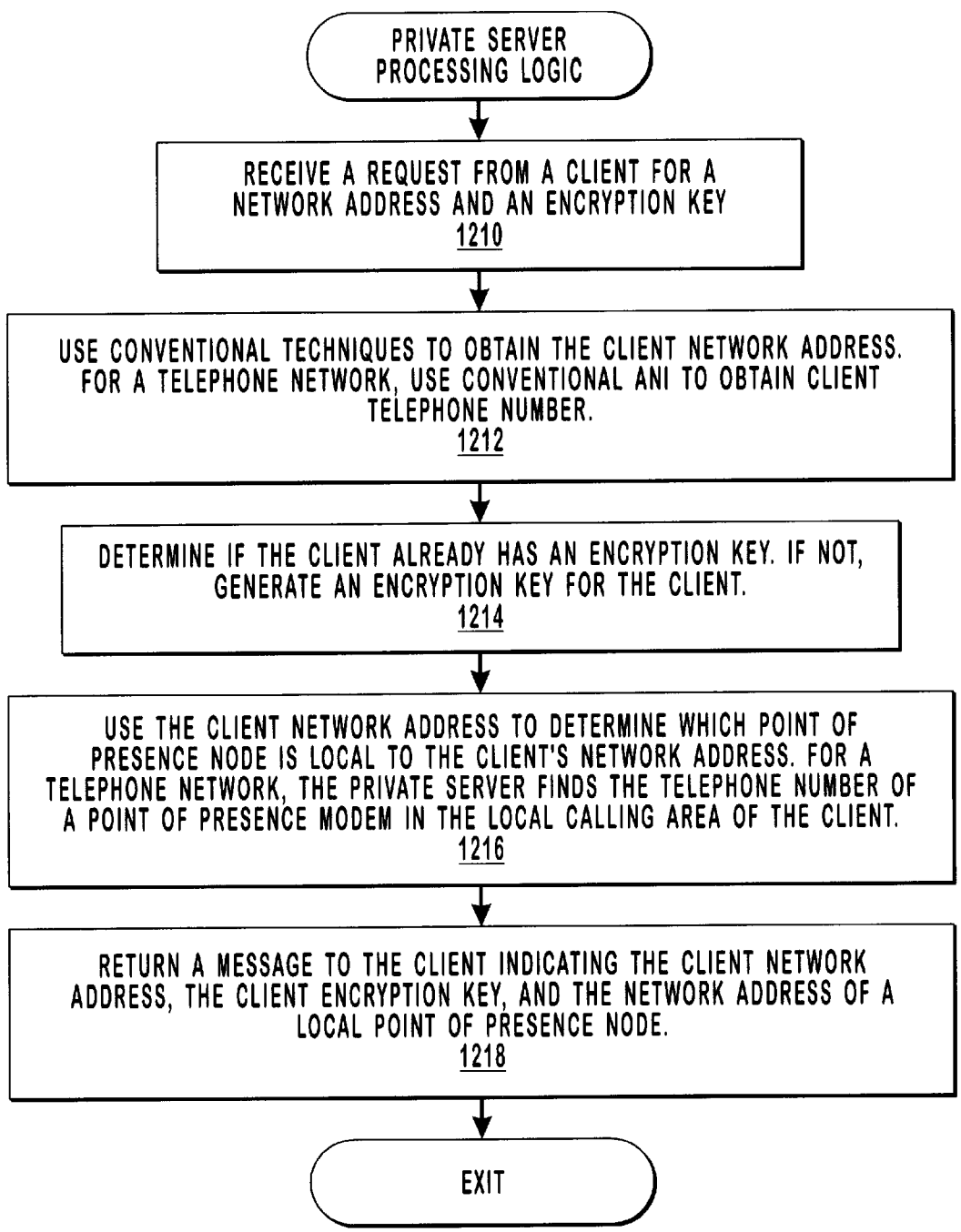

Referring now to FIG. 12, the private server 820 processing logic is illustrated. In processing block 1210, the private server 820 receives a request from a client 610 for a determination of the client's network address and the generation of an encryption key for the client. The private server 820 uses conventional techniques to obtain the client network address in processing block 1212. In the case of a POTS telephone network connection between private server 820 and client 610, private server 820 uses conventional automatic number identification (ANI) techniques to obtain the client telephone number from where the telephone call to the private server 820 originated. In the preferred embodiment, private server 820 provides a known (800) telephone number which a client 610 may use to access private server 820. Once this connection to private server 820 is made, the network address determination logic 910 of private server 820 uses standard telephone ANI functionality to determine the telephone number or network address of the client 610 which originated the telephone call (processing block 1212).

In processing block 1214, private server 820 checks a storage location within encryption key storage 912 to determine if an encryption key for the requesting client has already been determined. If this is not the case, a new and unique encryption key for this particular client is generated by encryption key generation logic 912 using conventional techniques. This newly generated encryption key for the client is then stored in encryption key storage 912.

In processing block 1216, the client network address is used by the private server 820 to determine which point of presence node is local to the client's network address. The point of presence node locality determination logic 914 of private server 820 includes information indicating which point of presence nodes are local to a particular block of client network addresses. The logic within point of presence node locality determination logic 914 compares the particular client network address with a block of client network addresses to determine the point of presence node that is local for the corresponding block of client network addresses. In the case of a telephone network, the client network address corresponds to a client telephone number which includes an area code. In some cases a point of presence node having the same area code as the client network address represents a point of presence node which is local to the client network address. In other circumstances, it is necessary to obtain other information which defines whether or not a point of presence node telephone number is local to a particular client network address. In either case, conventional techniques are known for making the association between point of presence node telephone numbers and client telephone numbers. Using logic 914, private server 820 finds the telephone number of a point of presence node or modem which is in the local calling area of the client represented by the client network address (processing block 1216).

In processing block 1218, private server 820 returns a message to the requesting client indicating the client network address, the client encryption key, and the network address of a local point of presence node. This information, generated or obtained by private server 820 is provided to client 610 in processing block 1218. Private server processing then terminates through the exit block illustrated in FIG. 12.

Referring again to FIG. 11, the client network address and the client encryption key is obtained by the client from the private server 820 in processing block 1112 as described above. The client network address is stored in network address storage area 846 illustrated in FIG. 8. The client encryption key obtained from private server 820 is stored in encryption key storage area 844 illustrated in FIG. 8. Both the client network address and the client encryption key are stored in secure client storage areas 846 and 844, respectively (processing block 1114).

The network address of a local point of presence node is obtained by client 610 from private server 820 in processing block 1116. The network address of the local point of presence node is determined by private server 820 as described above in connection with FIG. 12.

In processing block 1118, client 610 disconnects from private server 820. Once client 610 obtains the client network address, the client encryption key, and the network address of a local point of presence node from the private server, communication with private server 820 is no longer necessary. Therefore, client 610 can disconnect from the private server 820. This aspect of the present invention represents an advantage in that the client 610 does not need to maintain a prolonged secure connection with private server 820. Client 610 establishes a connection with the local point of presence node identified by private server 820. In the case of a POTS telephone network, client 610 dials the telephone number of the local point of presence node and initializes a data connection with the modem of the local point of presence node.

Figure 13:
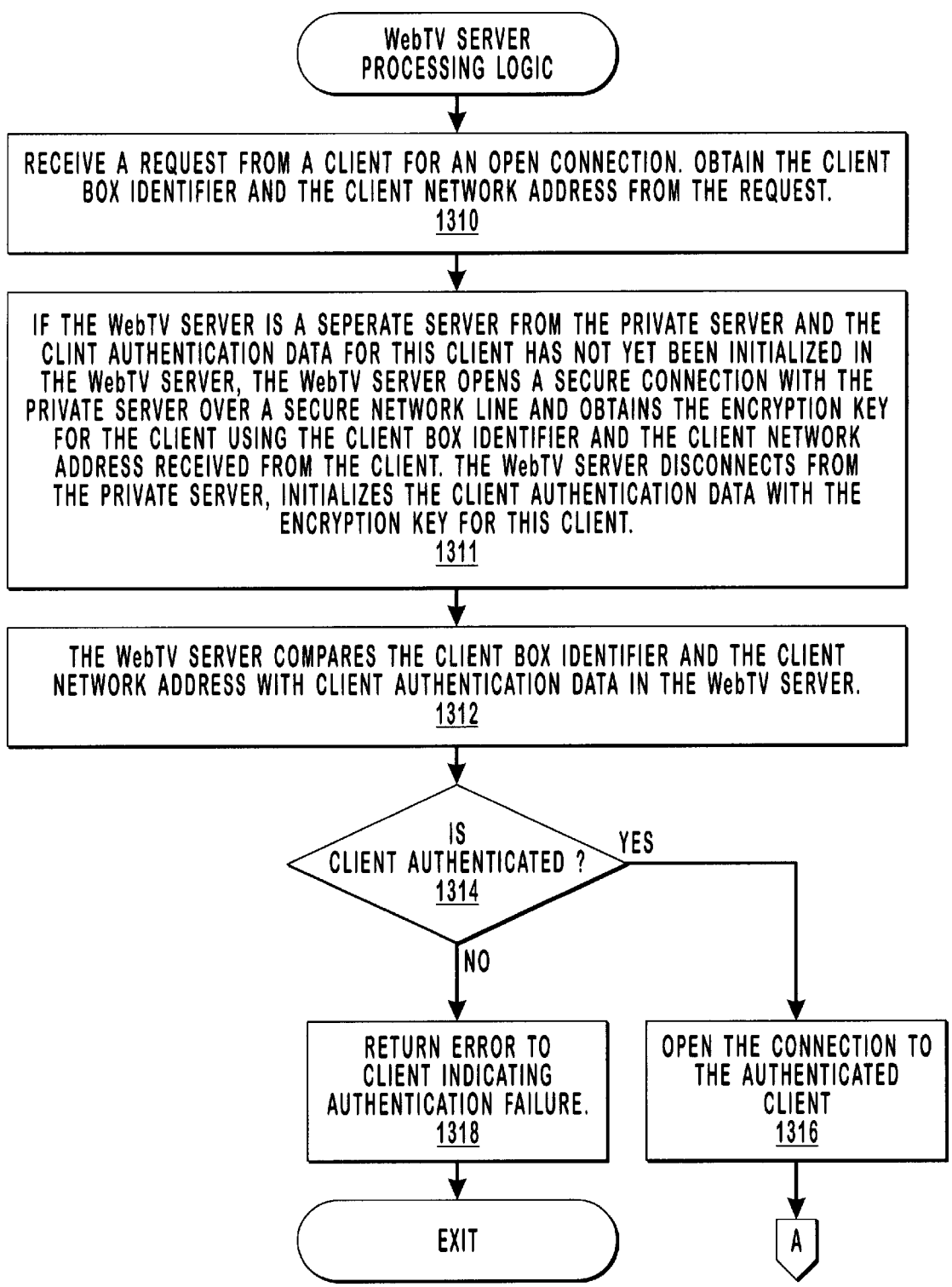
Figure 14:
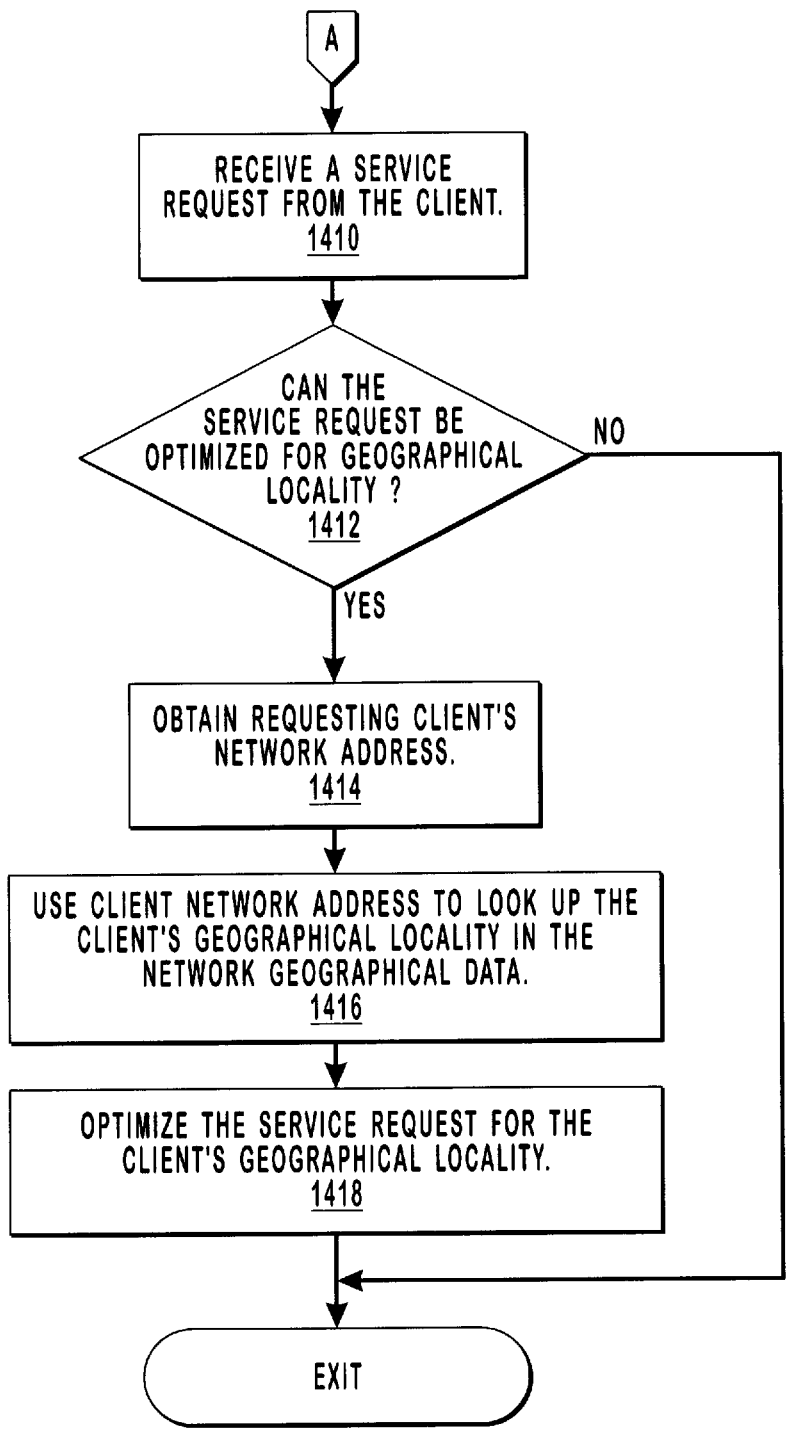

In processing block 1120, client 610 opens a connection with the WebTV server 620 through the point of presence node using the client encryption key to establish a secure connection with the WebTV server 620 over an unsecure network line 1020. FIGS. 13 and 14 describe the WebTV server 620 processing logic in more detail from the perspective of the server 620. On the client side, client 610 requests a connection with WebTV server 620 in block 1120 then exits through the exit block illustrated in FIG. 11.

Referring now to FIG. 13, the WebTV server 620 processing logic is illustrated. In block 1310, server 620 receives a request from a client 610 for an open connection. Because a transaction between a client 610 and WebTV server 620 must be a secure transaction, it is necessary for WebTV server 620 to authenticate the client from which a connection request is received. The client box identifier and the client network address received from the client can be used by WebTV server 620 to authenticate the client 610. However, it is necessary for the WebTV server 620 to obtain the client encryption key in order to decrypt the encrypted messages received from client 610. This client encryption key cannot be transferred to WebTV server 620 over an unsecure data communication line. WebTV server 620 must obtain the client encryption key from a secure source. In the preferred embodiment, private server 820 can be used by WebTV server 620 as a source for obtaining the client encryption key. In the same manner that client 610 established a connection with private server 820, WebTV server 620 can establish a private and secure data communication line with private server 820. In processing block 13 11, WebTV server 620 opens a secure connection with private server 820 over a secure network line and obtains the client encryption key using the client box identifier and the client network address received from the client in the open connection request.

Figure 15:
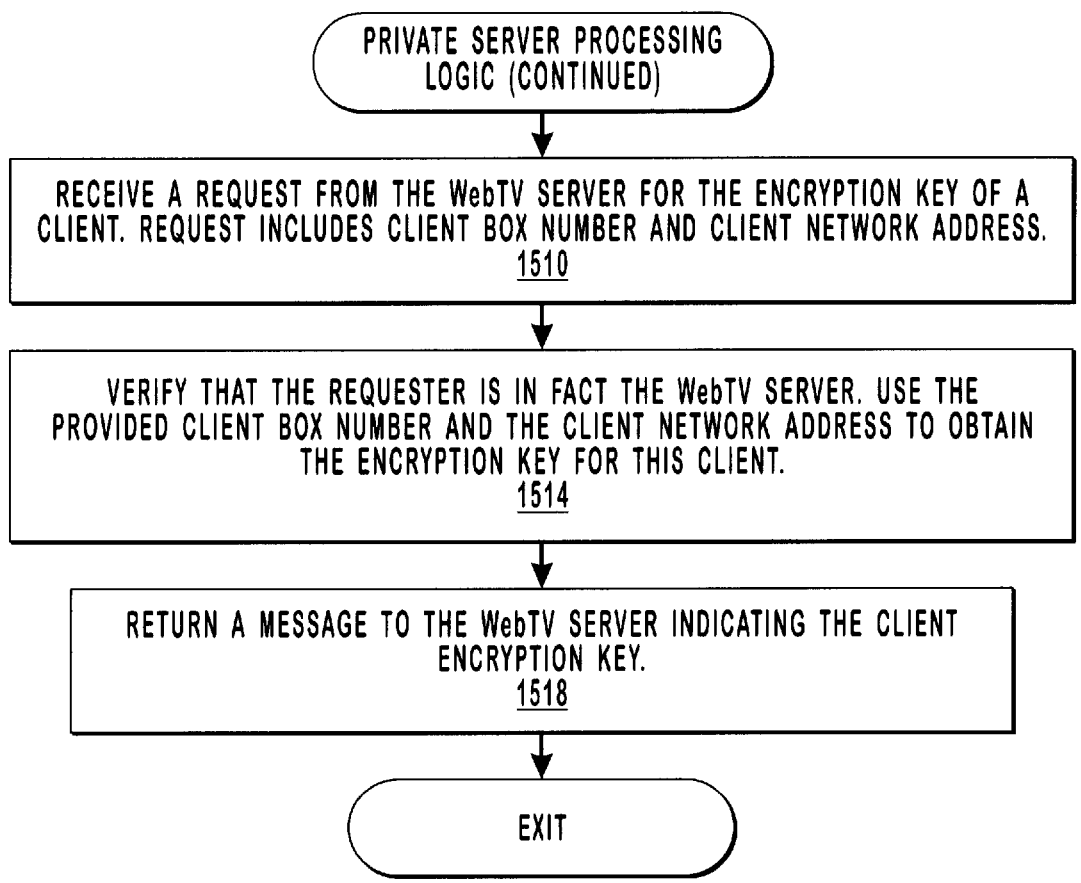

Referring now to FIG. 15, the private server 820 processing logic for handling a request from WebTV server 620 is illustrated in flow chart form. In processing block 1510, private server 820 receives a request from WebTV server 620 for the encryption key associated with a particular client identified by a client box number and a client network address. Private server 820 first verifies that the requester is in fact the WebTV server 620 using a predefined passcode associated with the WebTV server 620. The encryption key generation logic 912 of private server 820 then uses the client box number and client network address provided by the WebTV server 620 to obtain the encryption key for the identified client (processing block 1514). If the identified client had previously established a connection with private server 820, the encryption key associated with that client will be stored in encryption key generation storage area 912. This client encryption key is retrieved from storage area 912 by private server 820 and transferred to WebTV server 620 in a secure message in processing block 1518. Private server processing then terminates at the exit block illustrated in FIG. 15.

Referring again to FIG. 13 at processing block 1311, WebTV server 620 has obtained the client encryption key from private server 820. WebTV server 620 can now disconnect from the private server 820. WebTV server 620 updates its own encryption key storage area 1013 with the client encryption key retrieved from private server 820.

In processing block 1312, the WebTV server 620 authenticates the requesting client using the client box identifier and the client network address. The client box identifier and the client network address are compared with client authentication data maintained in WebTV server 620 in client authentication data storage area 1010. Using the client box identifier and the client network address, it can be determined that a particular WebTV client box is operating at a particular network address. If further authentication is required in an alternative system, a password or account code may also be requested from the client 610 and/or a particular user. All this information can be stored and managed within client authentication data storage area 1010 on WebTV server 620. If the client box identifier and client network address are found and authenticated within client authentication data 1010, a connection is opened between client 610 and WebTV server 620 in processing block 1316. WebTV server 620 processing for the authenticated client then continues at the bubble labeled A illustrated in FIG. 14. If, however, the client is not authenticated, an error message is returned to the requesting client indicating an authentication failure in processing block 1318. Processing for WebTV server 620 then terminates at the exit block illustrated in FIG. 13.

An ANI-verification connection from a client to a private server typically costs more (approximately $0.02 for 20 seconds) than the local call to a point of presence node. Thus, it is not cost effective to perform ANI verifications too often. However, it is worth performing ANI verification upon: 1) initial activation of a client box (i.e., network interface device), 2) periodically to make sure the client box has not moved to a different telephone number, or 3) whenever suspicious activity (e.g. multiple failed password attempts) occurs on a client box. It will be apparent to one of ordinary skill in the art that the ANI verification processes taught herein can be employed in a number of different circumstances.

In an alternative embodiment of the present invention, the WebTV server 620 and private server 820 can be one in the same computer system. In this embodiment, the transaction between WebTV server 620 and private server 820 for exchanging a client encryption key will not be necessary as the client encryption key will already be resident within the same system. In this situation, the WebTV server 620 will merely retrieve the client encryption key from an encryption key storage area 912 of the combined server system.

Referring now to FIG. 14, WebTV server 620 processing continues for an authenticated client at the bubble labeled A. In this circumstance, a data communication connection between the client 610 and WebTV server 620 has been opened. Because both client 610 and WebTV server 620 have a common encryption key as obtained in the processing steps described above, the communication between client 610 and server 620 can be encrypted thereby providing a secure communication line over an otherwise unsecure network connection. Therefore, subsequent service requests from client 610 and corresponding responses from WebTV server 620 can be encrypted and secure data communication can be ensured.

In processing block 1410 illustrated in FIG. 14, an encrypted service request is received by WebTV server 620 from client 610. A client network address is typically provided as part of the client service request. Although the client network address typically represents a logical network location of the client, in some networks, the client network address can also be associated with the geographical location of the client. For example, in a POTS telephone network, the client network address is represented as the telephone number of a client. Using conventional techniques, a telephone number can be associated with a geographical location. The area code is a typical component of a client telephone number. The area code is associated with a well defined geographical region as established by the conventional telephone companies that manage the telephone network. In addition, the three digit prefix of a seven digit telephone number further identifies a particular geographical sub-region within the region identified by the area code. The remaining four digits of a seven digit telephone number further define a particular location within the said-defined sub-region. Using this conventional telephone number information, a set of network geographical data can be generated which associates telephone numbers with particular geographical locations. This information is stored in WebTV server 620 in network geographical data 1012. In network environments other than a telephone network, other associations between client network addresses and corresponding geographical locations can be defined and stored in network geographical data 1012.

Client 610 benefits in a number of ways by having WebTV server 620 able to ascertain the geographical locality from which client 610 is communicating with WebTV server 620. For example, various client service requests can be optimized based on the geographical locality from which the service request is originated. In the case of a business transaction for example, a client may request the delivery of goods through WebTV server 620. By knowing the geographical locality from which the client originated the delivery request, WebTV server 620 can select a delivery station geographically closest to the requesting client. In other circumstances, the particular services provided by WebTV server 620 may differ depending upon the geographical location of a client. For example, the client may request the delivery of a high data rate information stream to the client site. This high data rate information stream may represent a video stream, an audio stream, or other content intensive information stream. Depending upon the information stream infrastructure surrounding the client locality, WebTV server 620 may choose an optimal information stream delivery mechanism. For example, the geographical location at which a client is originating a request may have integrated services digital network (ISDN) service available at that location. If this is the case, WebTV server 620 can automatically configure delivery of information to a particular client over the ISDN network. On the other hand if cable modem service is available at the client locality, WebTV server 620 may alternatively deliver high data rate information to client 610 using a cable modem service. Either of these options may be optimally selected by WebTV server 620 using the geographical locality information corresponding to a particular client as maintained in network geographical data 1012 and associated with a particular client network address.

In the case of a telephone network, the server 620 uses the requesting client's telephone number to determine a geographical location of the client without the client having to specify its address, telephone number or other type of locality information. The telephone number is mapped to a geographical location using well known techniques, such as an area code map database. Using the requesting client's telephone number, the service provider or WebTV server 620 can select an appropriate supplier or warehouse closest to the client's location. Without knowledge of the client's location, an inefficient delivery scenario might result. For example, a client could order goods from a supplier who delivers the goods from a distant warehouse even though a similar warehouse was located close to the client's location.

In other situations, a service provider can customize the services provided based on the requesting client's telephone number. For example, a specific menu of items associated with particular geographic locations can be offered for particular clients based on the ANI-derived requesting client's telephone number. In another example, service offerings, prices of offerings, or times of offerings can be varied based on the ANI-derived requesting client's telephone number.

Referring again to FIG. 14, if the client service request can be optimized for a particular geographical location associated with the client, the client network address is obtained in block 1414. Using the client network address, WebTV server 620 accesses the network geographical data 1012 to determine the corresponding client geographical locality (processing block 1416). Using the client geographical locality thus obtained, the client service request can be optimized in processing block 1418. WebTV server 620 processing then terminates at the exit block illustrated in FIG. 14. If in decision block 1412, the service request cannot be optimized based on geographical locality, this portion of WebTV server processing then terminates at the exit block illustrated in FIG. 14.

In another embodiment of the ANI private server of the present invention, the private server 820 can be used to effect secure portions of an otherwise unsecure transaction. For example, a user might browse a catalog, product/service listing, or other commercial information on the WWW network through an unsecure connection; but, when the user is about to make a purchase and transmit a credit card number, personal information, or other confidential or proprietary information, the client 610 disconnects from the WWW (i.e., the unsecure network) and dials the private server 820 through a secure direct telephone call on the secure network in the manner described above in connection with FIG. 11. The private server 820 makes sure the ANI of the client 610 corresponds to the expected telephone number of the client box. If the ANI of the client 610 does not correspond to the expected telephone number of the client box (e.g. if a hacker attempts to forge a transaction from a pay telephone), the private server 820 rejects the transaction. Otherwise, if the client ANI does correspond to the expected telephone number of the client box, the client is validated. The validated client conducts a secure portion of its transaction on the secure network and then dials back to the unsecure network upon completion of the secure portion of the transaction as described above.

The geographic tailoring enabled by the WebTV network of the present invention offers several other advantages. By knowing where a particular client is geographically located using the WebTV network interface device's means for determining client location, the server response to client requests can be tailored to the client's particular geographic locality. For example, prior art systems provide a network capability with which a client may order goods or services from a server using an on-line service. These prior art servers, however, respond to every client request in the same way regardless of the client's geographic location. In the present invention, however, the server tailors its response to a particular client by knowing the client's geographical location as determined using the apparatus and processes described above. For example, a first particular geographical location may have ISDN and cable modem high speed data service. Another second particular geographical location may have only ISDN high speed data service. If a client A in the first location orders high speed data service from a WebTV server, client A is offered a choice between ISDN and cable modem service. If client B in the second location orders high speed data service from a WebTV server, the client B is only offered the ISDN service. This difference in the response to client A versus client B is possible because the WebTV server is able to determine the geographical location of the requesting client using the techniques described above. Further, once either client A or client B in this example selects a desired service, the request for high speed data service can be routed to the optimum high speed data service provider for the particular client's geographical location. Again, this efficient routing is possible because the WebTV server is able to determine the geographical location of the requesting client using the techniques described above. The geographic tailoring enabled by the present invention has several advantages. By knowing the geographical location of a requesting client, the server can customize an appropriate response to the particular client instead of responding in the same manner for all requesting clients. Further, the WebTV server of the present invention can effectively replace the conventional method of ordering goods and services through a voice call and the error-prone information collection methods connected therewith.

The determination and use of client geographical location as provided by the present invention is advantageous for other reasons as well. Using the techniques described above, the client can obtain its geographical location from the private server. This geographical location information can then be passed on to other servers with which the client may desire to conduct transactions. These other servers or third party servers may be completely independent from the WebTV network or WebTV servers. Thus, the WebTV private server can be used to optimize the on-line service provided by any independent network service provider. For example, a business, such as a florist or pizza parlor, etc., could offer an on-line service for ordering goods over a network. For the particular type of business, the geographical location may be significant. In the case of a business requiring delivery of the goods, like the sample pizza parlor or florist, the geographical location of the client is needed to facilitate delivery to the client. In this situation, the private server of the present invention provides the geographical locality of the client to the client. The client then passes this information to the third party server as part of the transaction with the third party server. The third party server uses the geographical locality information to optimize its transaction with the client without ever knowing that the private server of the present invention was involved.

The present invention is also advantageously used for enabling real time game play between networked game players. First, it is important to make a distinction here between two types of remote multiplayer games, 1) "real-time" or "twitch" games, and 2) "non-real-time" games. Twitch games are games that require split-second game control by players and cannot tolerate arbitrary communication latencies or delays. Twitch games are by far the most popular category of video games—typically all Top Ten games are twitch games—and include games such as "Mortal Kombat™", "John Madden Football™," "Sonic the Hedgehog™," and "Super Mario Brothers™." Typically, twitch games require less than 100 millisecond communications latency (i.e. delay for a player's action to take effect on the screen) for the games to be playable. Twitch games usually can not tolerate varying delays in communications latency.

Non-real-time games are games that are possible to play with substantial communications latency and with varying communications latency. Obvious games in this genre are "strategy" games such a chess and backgammon, but there are also moderate action games such as adventure games like "Return to Zork™" by Activision™ or the "King's Quest™" series from Sierra On-line™. The AT&T Imagi-Nation Network™ is an on-line service specializing in such non-real-time games. The Internet and the WWW are also used for playing non-realtime games.

One would think that with the popularity of multi-player twitch games, on-line services such as the ImagiNation Network™ would offer twitch games for their users. However, these services and other services implemented on the Internet or WWW do not offer such games; because, it is not possible to achieve less than 100 milliseconds (msec) latency, or even consistent latency, given the architecture of current public-switched data networks.

There are substantial (and often unpredictable) latencies through current network architectures. Each modem in a communications chain introduces latencies as high as 20 or 30 msec (varying by modem manufacturer and model). The telephone network introduces latencies (although they are minimal within a local calling area). Wide area networks (WANs) introduce unpredictable latencies (as much as 1.5 seconds round-trip). In addition, the on-line service's computers themselves introduce latencies, typically increasing as the number of active users increases.

As a result, remote multi-player twitch games can only be played through a direct telephone connection of one game player to another player, barring a major overhaul (requiring enormous capital investment) of the existing public access data networks. Consequently, on-line services and Internet or WWW based services are limited to hosting non-real-time multi-player games.

Although the Internet and WWW are unsatisfactory networks for real-time games due to the latency problems, the Internet and WWW are a good source for matching together remote players who wish to play the same game together at the same time. This is because the Internet is such a ubiquitous network. Thus, it would be advantageous to use the Internet and WWW or other public network infrastructure to match remote game players and to post game results; yet, use another low-latency network for actually playing the real-time game. This problem with real-time networked game playing is not recognized or solved by the prior art. The present invention provides the solution as described below.

As described above, the present invention provides a WebTV client 610, which initially establishes a secure communication with private server 820 over a first network 858 in order to subsequently establish a secure communication environment through conventional second network 612. Thus, a first network is used to define parameters and enable communications over a second network. This concept is used in the real-time game environment as well. However, in the real-time game context, the WebTV client 610 initially establishes a connection with the WebTV server over a non-real-time network, such as the Internet or WWW, in order to request player matching with another remote client wishing to play the same game at the same time. Once the server has matched the two networked clients as opponents in a networked real-time game, the two matched clients disconnect from the non-real-time network and connect with each other over a real-time network using network address information obtained from the WebTV server. The process is illustrated in more detail in FIG. 16.

Figure 16:
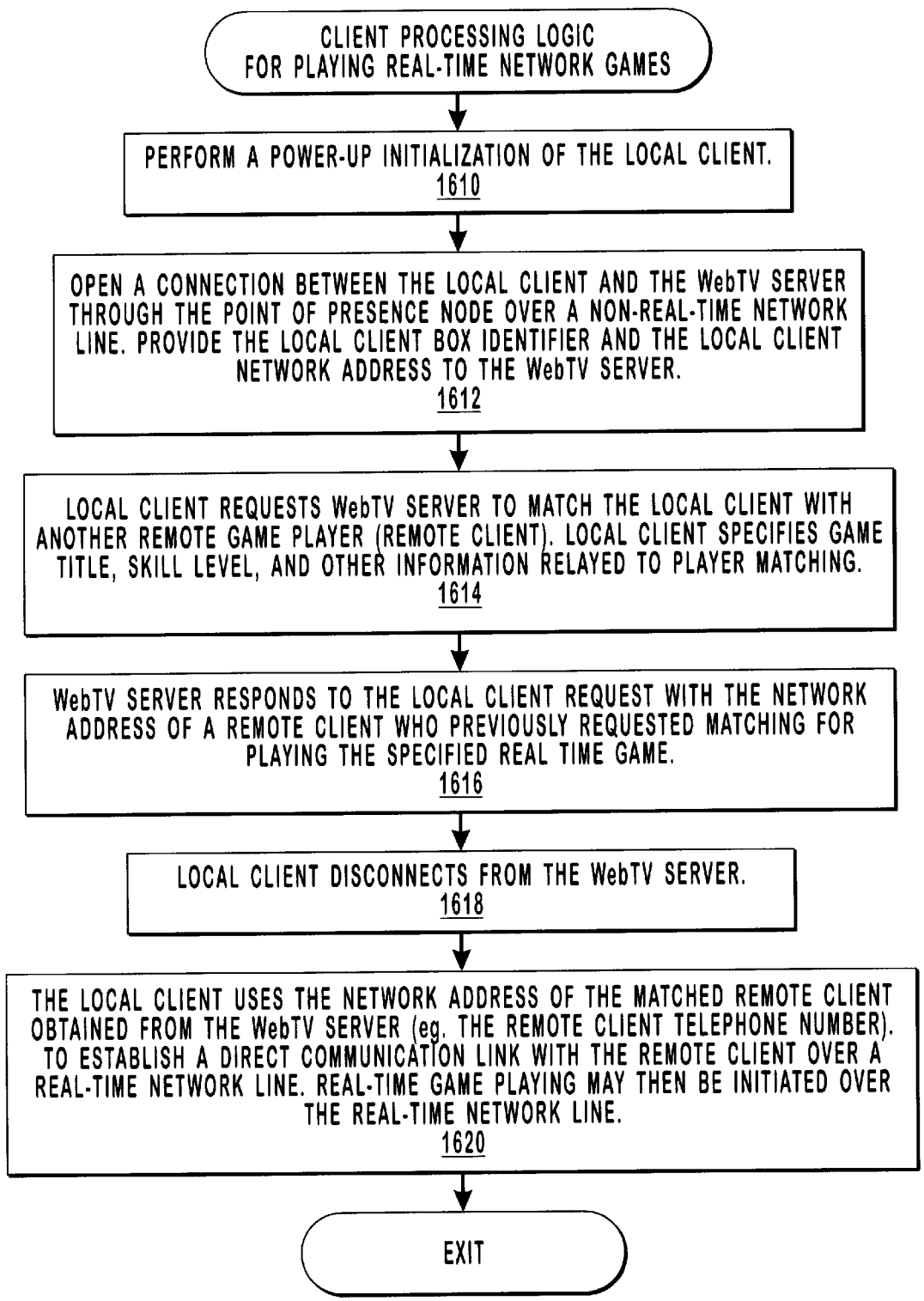

Referring now to FIG. 16, the real-time network game mechanism of the present invention is illustrated. In FIG. 16, a flow chart illustrates the processing performed by a WebTV client 610 desiring to play a real-time game with a networked remote client opponent. The logic illustrated in FIG. 16 is used by a local client 610 to establish a real-time data communication link with another remote client 610 over a real-time data network, such as a direct telephone link between clients 610. In a first processing step 1610, local client 610 performs a power-up initialization. Next, local client 610 connects to a WebTV server 620 (block 1612) over a non-real-time network line 856 through point of presence node 810 or directly on line 852 as shown in FIG. 8. Once local client 610 is connected with WebTV server 620, local client 610 requests the WebTV server 620 to match the local client 610 with another remote client who previously notified WebTV server 620 of the desire to play a specified real-time game (block 1614). The local client 610 provides its network address to WebTV server 620. The remote client 610 previously provided its network address to WebTV server 620. The WebTV server 620 matches the two clients using various items of information to effect the match. This information includes the geographical location of the clients as indicated by their network address, the name or type of real-time twitch game to be played, the skill level specified for each client, and other related information. Once the WebTV server matches the clients 610, the WebTV server notifies each client of the network address of its matched opponent (block 1616). In response, each matched client disconnects from the WebTV server (block 1618), and establishes a link on a real-time network to the matched opponent. In the preferred embodiment, this link can be established using a direct telephone line and the network address provided by each client is its telephone number. A very low latency communication link can be established between matched clients thereby enabling the playing of a real-time networked game (block 1620). It will be apparent to one of ordinary skill in the art that other conventional real-time network infrastructures may be equivalently used to effect the actual game play once the client game players have been matched on the non-real-time network.

Thus, an improved apparatus and method for using network address information to improve the performance of network transactions has been described.

The specific arrangements and methods described herein are merely illustrative of the principles of the present invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

We claim:

1. A client network interface device having a processor and a memory coupled to said processor, the memory having stored therein sequences of instructions to be executed by said processor, said instructions comprising:

a first instruction for accessing a first server over a secure data communication line to obtain a client encryption key;

a second instruction for accessing a second server over an unsecure data communication line to establish a connection with said second server;

a third instruction for encrypting information sent to said second erver over said connection using said client encryption key obtained from said first server; and a fourth instruction for decrypting information received from said second server over said connection using said client encryption key obtained from said first server.

2. A first server having a processor and a memory coupled to said processor, the memory having stored therein sequences of instructions to be executed by said processor said instructions comprising:

a first instruction for receiving a request from a client over an unsecure data communication line to establish a connection with said client;

a second instruction for accessing a second server over a secure data communication line to obtain a client encryption key corresponding to said client;

a third instruction for decrypting information received from said client over said connection using said client encryption key obtained from said second server; and a fourth instruction for encrypting information sent to said client over said connection using said client encryption key obtained from said second server.

3. The first server as claimed in claim 2 wherein said sequences of instructions further includes instructions which when executed by said processor cause said processor to perform the steps of:

obtaining a first client network address from said client;

accessing said second server over a secure data communication line to obtain a second client network address corresponding to said client;

authenticating said client based on said first client network address and said second client network address.

4. The first server as claimed in claim 2 wherein said sequences of instructions further includes instructions which when executed by said processor cause said processor to perform the steps of:

obtaining a client network address corresponding to said client; and obtaining a geographical locality of said client based on said client network address.

5. The first server as claimed in claim 4 wherein said sequences of instructions further includes instructions which when executed by said processor cause said processor to perform the steps of:

determining if said client has ISDN service available based on said geographical locality of said client.

6. The first server as claimed in claim 4 wherein said sequences of instructions further includes instructions which when executed by said processor cause said processor to perform the steps of:

determining if said client has cable modem service available based on said geographical locality of said client.

7. The first server as claimed in claim 4 wherein said sequences of instructions further includes instructions which when executed by said processor cause said processor to perform the step of:

periodically re-obtaining said client network address.

8. The first server as claimed in claim 4 wherein said sequences of instructions further includes instructions which when executed by said processor cause said processor to perform the step of:

re-obtaining said client network address, if suspicious activity being performed by said client is detected.

9. The first server as claimed in claim 4 wherein said sequences of instructions further includes instructions which when executed by said processor cause said processor to perform the step of:

receiving a client network address entered by a client user;

comparing said user-entered client network address with said client network address obtained in said obtaining a client network address step.

10. A server having a processor and a memory coupled to said processor, the memory having stored therein sequences of instructions to be executed by said processor, said instructions comprising:

a first instruction for receiving a request from a client over a secure data communication line to obtain a client network address;

a second instruction for obtaining said client network address;

a third instruction for sending said client network address to said client.

11. The server as claimed in claim 10 wherein said sequences of instructions for said obtaining step further includes instructions which when executed by said processor cause said processor to perform the steps of activating an automatic number identification function.

12. The server as claimed in claim 10 wherein said sequences of instructions further includes instructions which when executed by said processor cause said processor to perform the steps of:

generating a client encryption key for said client; and storing said client encryption key in said server.

13. The server as claimed in claim 10 wherein said sequences of instructions further includes instructions which when executed by said processor cause said processor to perform the steps of:

determining a client geographical locality based on said client network address.

14. A client network interface device having a processor and a memory coupled to said processor, the memory having stored therein sequences of instructions to be executed by said processor, said instructions comprising:

a first instruction for connecting to an unsecure server over an unsecure data communication line to perform unsecure portions of a data transaction;

a second instruction for disconnecting from said unsecure server; and a third instruction for connecting to a secure server over a secure data communication line to perform secure portions of said data transaction.

15. A client network interface device having a processor and a memory coupled to said processor, the memory having stored therein sequences of instructions to be executed by said processor, said instructions comprising:

a first instruction for connecting to a server over a data communication line to request matching with another matched remote opponent for playing a real-time networked game;

a second instruction for disconnecting from said server; and a third instruction for connecting to said matched remote opponent over a real-time data communication line to play said real-time networked game.

16. A client network interface device having a processor and a memory coupled to said processor, the memory having stored therein sequences of instructions to be executed by said processor, said instructions comprising:

a first instruction for receiving a request for service from a client over a data communication line;

a second instruction for obtaining a client network address corresponding to said client;

a third instruction for obtaining said client's geographical locality based on said client's network address; and a fourth instruction for generating a response to said client request for service, said response being tailored to said geographical locality of said client.

17. The server as claimed in claim 16 wherein said client network address and said geographical locality of said client is obtained from said client.

18. The server as claimed in claim 16 wherein said client network address and said geographical locality of said client is obtained from said client.

19. The server as claimed in claim 16 wherein said client network address and said geographical locality of said client is obtained from a private server.

20. The server as claimed in claim 16 wherein said client network address and said geographical locality of said client is sent to a different server.

21. A method for establishing secure communications over a network between a client network interface device and a network server comprising the steps of:
   obtaining, by said client network interface device an encryption key and network address for said client network interface device from a private server over a first secure communication connection;
   transmitting said network address from said client network interface device to said network server;
   obtaining, by said network server said encryption key from said private server using said network address to identify said client network interface device over a second secure communication connection; and
   establishing a third secure communication connection between said network interface device and said network server using said encryption key.

22. The method for establishing secure communications over a network as claimed in claim 21 wherein a client box identifier is used in addition to said network address for identification of said client network interface device.

23. The method for establishing secure communications over a network as claimed in claim 21 wherein said first secure communication connection is a standard telephone connection.

24. The method for establishing secure communications over a network as claimed in claim 21 wherein said second secure communication connection is a standard telephone connection.

25. The method for establishing secure communications over a network as claimed in claim 21 wherein said first secure communication connection is an ISDN network connection.

26. The method for establishing secure communications over a network as claimed in claim 21 wherein said second secure communication connection is an ISDN network connection.

27. The method for establishing secure communications over a network as claimed in claim 21 wherein said first secure communication connection is a cable network connection.

28. The method for establishing secure communications over a network as claimed in claim 21 wherein said second secure communication connection is a cable network connection.

29. The method for establishing secure communications over a network as claimed in claim 21 wherein said network address is a telephone number from which said client network interface device calls said private server.

30. The method for establishing secure communications over a network as claimed in claim 29 wherein said network address is determined by said private server using an automatic number identification function.

31. The method for establishing secure communication over a network as claimed in claim 21 wherein said private server periodically generates a new encryption key.

32. The method for establishing secure communications over a network as claimed in claim 21 wherein said private server determines said client network interface device's geographical locality.

33. The method for establishing secure communication over a network as claimed in claim 32 wherein said geographical locality is determined by said client network interface device's network address.

34. The method for establishing secure communications over a network as claimed in claim 32 wherein said geographical locality is determined by said client network interface device's client box identifier.

35. The method for establishing secure communications over a network as claimed in claim 32 wherein said geographical locality of said client network interface device is used by said network server to provide geographical location-specific information to said client network interface device.

36. The method for establishing secure communications over a network as claimed in claim 32 wherein said geographical locality of said client network interface device is used by said network server to optimize communications with said client network interface device by choosing an optimal information stream delivery system based on said geographical locality.

37. In a network system including a client network interface device, a network server, and a private server, a computer program product for establishing secure communications over said network between said client network interface device and said network server, said computer program product comprising:
   a computer-readable medium for carrying computer-executable instructions, wherein said computer instructions comprise:
      code means at said client network interface device for obtaining an encryption key and network address for said client network interface device from said private server over a first secure communication connection;
      code means at said client network interface device for initiating transmission of said network address from said client network interface device to said network server;
   code means at said network server for obtaining said encryption key from said private server using said network address to identify said client network interface device over a second secure communication connection; and
      code means for establishing a third secure communication connection between said client network interface device and said network server using said encryption key.

38. The computer program product as claimed in claim 37 wherein said code means at said code means at said network server for obtaining said encryption key uses a client box identifier in addition to said network address for identification of said client network interface device.

39. The computer program product as claimed in claim 37 wherein said first secure communication connection is a standard telephone connection.

40. The computer program product as claimed in claim 37 wherein said second secure communication connection is a standard telephone connection.

41. The computer program product as claimed in claim 37 wherein said first secure communication connection is an ISDN network connection.

42. The computer program product as claimed in claim 37 wherein said second secure communication connection is an ISDN network connection.

43. The computer program product as claimed in claim 37 wherein said first secure communication connection is a cable network connection.

44. The computer program product as claimed in claim 37 wherein said second secure communication connection is a cable network connection.

45. The computer program product as claimed in claim 37 wherein said network address is a telephone number from which said client network interface device calls said private server.

46. The computer program product as claimed in claim 45 wherein said network address is determined by said private server using an automatic number identification function.

47. The computer program product as claimed in claim 37 wherein said private server periodically generates a new encryption key.

48. The computer program product as claimed in claim 37 wherein said private server determines said client network interface device's geographical locality.

49. The computer program product as claimed in claim 48 wherein said geographical locality is determined by said client network interface device's network address.

50. The computer program product as claimed in claim 48 wherein said geographical locality is determined by said client network interface device's client box identifier.

51. The computer program product as claimed in claim 48 wherein said geographical locality of said client network interface device is used by said network server to provide geographical location-specific information to said client network interface device.

52. The computer program product as claimed in claim 48 wherein said geographical locality of said client network interface device is used by said network server to optimize communications with said client network interface device by choosing an optimal information stream delivery system based on said geographical locality.

* * * * *

UNITED STATES PATENT AND TRADEMARK OFFICE
CERTIFICATE OF CORRECTION

PATENT NO. : 5,862,220
DATED : January 19, 1999
INVENTOR(S) : Stephen G. Perlman It is certified that error appears in the above-identified patent and that said Letters Patent is hereby corrected as shown below:

On the title page, item [57] Abstract:

Line three, after "transactions" delete [.].

Figure 13, Box 1318: after "ERROR" insert --MESSAGE--

Col. 10, ln. 35: after "block" change "13 11" to --1311--

Col. 15, ln. 2: after "games such" change "a" to --as--

Col. 17, ln. 3: after "processor" insert --,--

Col. 19, ln. 65: after "secure" change "communication" to --communications--

Col. 20, ln. 5: after "secure" change "communication" to --communications--

Col. 20, ln. 32: after "computer" insert -- -executable--

Signed and Sealed this

Fourth Day of July, 2000

*Attest:*

Q. TODD DICKINSON

*Attesting Officer*    *Director of Patents and Trademarks*